US007660771B2

(12) United States Patent
Orcutt

(10) Patent No.: US 7,660,771 B2
(45) Date of Patent: Feb. 9, 2010

(54) EXPRESS CHECK CONVERSION

(75) Inventor: Laura Lee Orcutt, Chanhassen, MN (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 10/699,552

(22) Filed: Oct. 30, 2003

(65) Prior Publication Data

US 2005/0097050 A1    May 5, 2005

(51) Int. Cl.
G06F 17/60 (2006.01)
(52) U.S. Cl. .............................. 705/64; 705/42; 705/35; 705/1
(58) Field of Classification Search .................. 705/64, 705/42, 35, 1
See application file for complete search history.

(56) References Cited

U.S. PATENT DOCUMENTS

| 5,053,607 | A |   | 10/1991 | Carlson et al. ............... 235/379 |
| 5,175,682 | A |   | 12/1992 | Higashiyama et al. ....... 364/408 |
| 5,195,133 | A |   | 3/1993 | Kapp et al. ..................... 380/9 |
| 5,297,202 | A |   | 3/1994 | Kapp et al. ..................... 380/9 |
| 5,326,959 | A |   | 7/1994 | Perazza ........................ 235/379 |
| 5,412,190 | A |   | 5/1995 | Josephson et al. ........... 235/379 |
| 5,465,206 | A |   | 11/1995 | Hilt et al. ..................... 364/406 |
| 5,484,988 | A |   | 1/1996 | Hills et al. .................... 235/379 |
| 5,532,464 | A |   | 7/1996 | Josephson et al. ........... 235/379 |
| 5,691,524 | A |   | 11/1997 | Josephson ................... 235/379 |
| 5,783,808 | A |   | 7/1998 | Josephson ................... 235/379 |
| 5,832,463 | A | * | 11/1998 | Funk ............................ 705/35 |
| 5,848,400 | A | * | 12/1998 | Chang .......................... 705/35 |
| 5,893,080 | A |   | 4/1999 | McGurl et al. ................ 705/40 |
| 5,920,847 | A |   | 7/1999 | Kolling et al. ................ 705/40 |
| 6,032,133 | A |   | 2/2000 | Hilt et al. ....................... 705/40 |
| 6,070,150 | A |   | 5/2000 | Remington et al. ........... 705/34 |
| 6,164,528 | A |   | 12/2000 | Hills et al. .................... 235/379 |
| 6,170,744 | B1 |   | 1/2001 | Lee et al. ...................... 235/380 |
| 6,189,785 | B1 |   | 2/2001 | Lowery ....................... 235/379 |
| 6,223,168 | B1 |   | 4/2001 | McGurl et al. ................ 705/40 |
| 6,243,689 | B1 |   | 6/2001 | Norton ........................ 705/18 |
| 6,283,366 | B1 |   | 9/2001 | Hills et al. .................... 235/379 |
| 6,301,379 | B1 |   | 10/2001 | Thompson et al. .......... 382/137 |
| 6,354,491 | B2 |   | 3/2002 | Nichols et al. .............. 235/379 |
| 6,408,284 | B1 |   | 6/2002 | Hilt et al. ....................... 705/40 |
| 6,654,487 | B1 | * | 11/2003 | Downs, Jr. ................... 382/139 |
| 6,754,640 | B2 | * | 6/2004 | Bozeman ..................... 705/40 |
| 7,020,639 | B1 |   | 3/2006 | Slater |
| 2003/0023555 | A1 |   | 1/2003 | Rees |
| 2003/0182227 | A1 | * | 9/2003 | Guzman ...................... 705/39 |

(Continued)

FOREIGN PATENT DOCUMENTS

JP          409178443 A   *  7/1997

OTHER PUBLICATIONS

S. Weiner; Electronic *Payments in the U.S. Economy: An Overview*.

(Continued)

*Primary Examiner*—Pierre E Elisca
(74) *Attorney, Agent, or Firm*—Merchant & Gould P.C.

(57) ABSTRACT

A technique is provided for automatically converting checks to ACH debits. The process is a two-part process in which the MICR line in a check is read at the point the check is presented and a decision is made if the check can be converted to an ACH debit. The decision is made by applying various rules. If the system is unable to convert the check to an ACH debit, then the check is processed as a normal check. If a decision is made that the check can be processed as an ACH debit, then the MICR line is parsed for the financial institution which issues the check to create the ACH debit.

24 Claims, 1 Drawing Sheet

U.S. PATENT DOCUMENTS

2004/0148235 A1 7/2004 Craig
2005/0091132 A1* 4/2005 Phillips et al. ............... 705/33

OTHER PUBLICATIONS

Curley, B.; Bank Systems + Technology; May 1999; *First Union Division Offers Check Processing At POS*.

Foster, C.; 1st European Financial Industry Technology Conference; 1989; Electronic Dealer Drafting-A Practical Application Of EDI.

"Saga Automated Clearing House Solution;" updated Apr. 04, 2006; <http://lasershowproduction.com/english/business/multikanalni_sistemi/clearing.htm>; 2 pages.

David, Rick; "Check 21—The Check Clearing for the 21st Century Act;" accessed Dec. 5, 2007; 3 pages.

IEEE; "A rule based expert system for check routing and cash letter management;" © 2007; 1 page.

Kendler, Peggy Bresnick; "Clearing and Settlement;" Bank Systems & Technology; Sep. 27, 2004; 4 pages.

NCR Corporation; "NCR Poised to Support Merchant Reduction of Check-Clearing Costs, In Step with New Back-Office Conversion Ruling;" May 10, 2007; 2 pages.

* cited by examiner

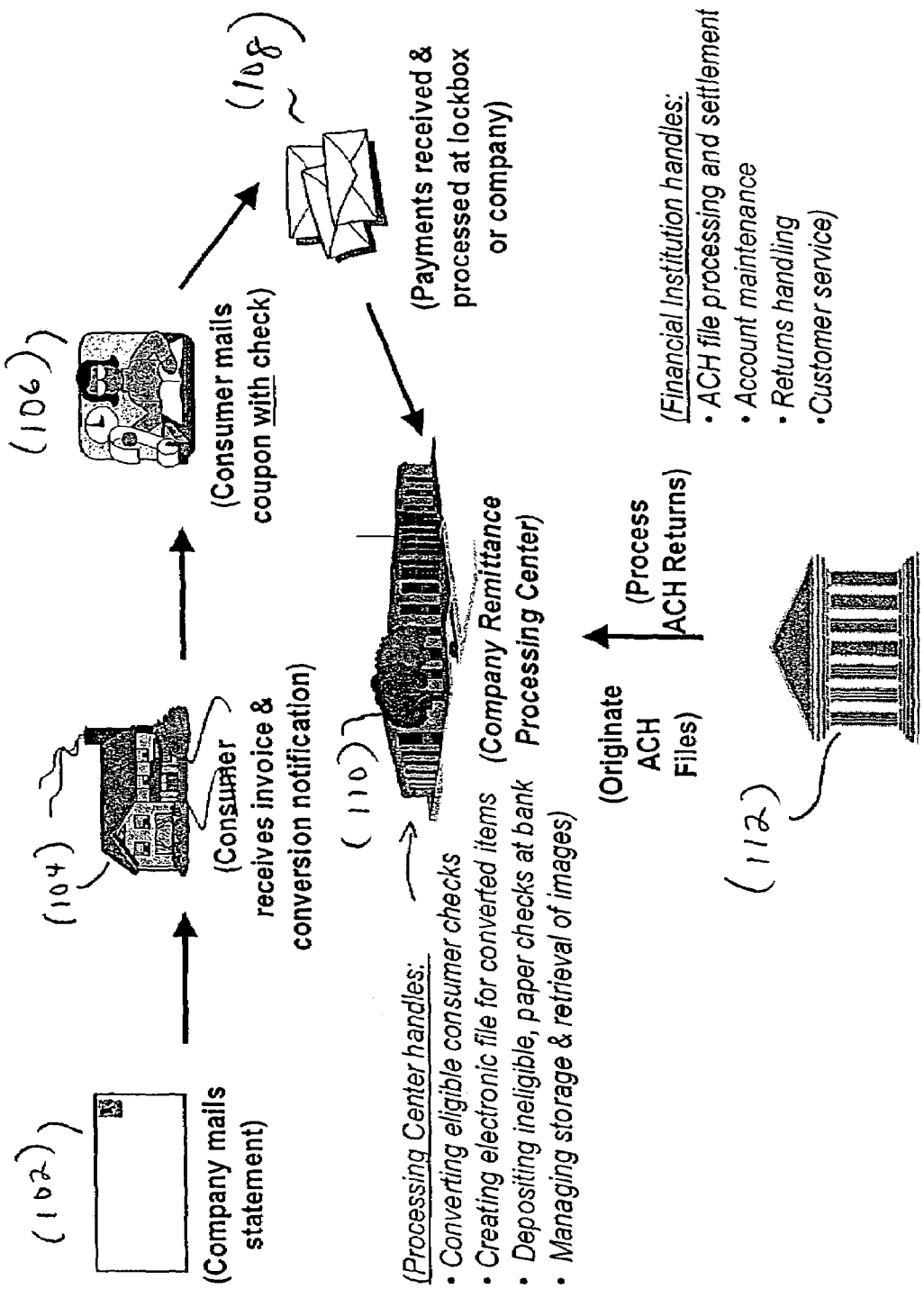

EXPRESS CHECK CONVERSION

BACKGROUND OF THE INVENTION

1. Technical Field

The invention relates generally to electronic checks processing. More particularly, the invention relates to a method and apparatus for automatically converting checks to ACH debits.

2. Description of the Prior Art

Due to recent changes in the Automated Clearing House (ACH) by the National Automated Clearing House Association (NACHA), billers may now convert consumer checks that have been mailed to a lockbox into electronic ACH debits providing the biller has provided notice to the consumer. It is a difficult process to separate consumer checks from ineligible items, and, for consumer checks that are eligible for conversion, to correctly interpret and convert the on-us field of a Magnetic Ink Character Recognition (MICR) line into the correct format for an ACH debit. It has been found that, typically, items that are decisioned incorrectly, or parsed incorrectly, result in ACH administrative returns, wherein the returns simply state that the account number is invalid.

Currently there are three primary applications for electronic check conversion to ACH debits: re-presented check entries (RCK), point of sale (POS), and retail lockbox, or accounts receivable check truncation (ARC).

Identifying Items Eligible for ACH Conversion.

Only consumer checks are eligible for conversion to ACH debits. Therefore, there must be a method in place for separating such eligible conversion items from money orders, travelers checks, cashier's checks, convenience checks (credit card balance transfer checks), commercial checks, government items, and the like, which are ineligible for conversion.

Linking the MICR Line with the Demand Deposit Account (DDA).

Currently, there is no standard for how or where identifying numbers appear in the MICR lines of checks. The bank routing and transit number, although standardized, must be identified and captured within the MICR line. The check sequence number and account number must be identified, separated, and captured in the correct order. This is difficult not only because they may appear in various positions within the on-us fields of the MICR line but also because some financial institutions require a different account number for an ACH debit than they do for a check.

In the case of credit unions using payable-through banks for check processing, the routing/transit number on the check MICR line is that of the payable through bank. The actual account number will likely contain a credit union identifier plus the account number. In order to convert a credit union payable-through draft to an ACH transaction, the R/T number must be changed to that of the credit union, and the credit union identifier must be removed from the account number.

Solving such data parsing challenges greatly reduce exception items, improve collection rates, improve processing quality, and satisfy consumer payment posting expectations.π involve electronic payments, as follows.

Carlson, Steven R. and Carlson, Paul R., Point-Of-Sale Device Particularly Adapted For Processing Checks, U.S. Pat. No. 5,053,607 (Oct. 1, 1991) disclose a check processing device that is particularly adapted for retailer/customer use at the point of sale through use of a MICR read head means, printer means and keypad means which feed information into a CPU which communicates, through an existing telecommunication system, with the customer's bank and the retailer's bank in order to transfer funds from the account of the customer to the account of the retailer.

Hills, Robert R. and Nichols, Henry R., Checkwriting Point Of Sale System, U.S. Pat. No. 5,484,988 (Jan. 16, 1996) disclose a point of sale system designed to read information from a consumer's check, credit card, or manual input with a subsequent debiting of a consumer's account and crediting a merchant's account for the goods or services provided. Point of sale terminals are designed to accept a form of credit card with a consumer's bank account information encoded thereon or in the alternative to read the MICR number from a consumer's check in order to verify that a consumer has an appropriate balance to conduct the transaction with a given merchant. Thereafter the transaction of that information is transmitted to a central computer system which verifies the consumer's credit worthiness and stores the transaction event information for subsequent bank reconciliation via the ACH network. The invention eliminates the need for paper checks with all bank reconciliation being accomplished electronically.

Hills, Robert R. and Nichols, Henry R. Checkwriting Point Of Sale System, U.S. Pat. No. 6,164,528 (Dec. 26, 2000), Checkwriting Point Of Sale System, U.S. Pat. No. 6,283,366 (Sep. 4, 2001) and Checkwriting Point Of Sale System, U.S. Pat. No. 6,354,491 (Mar. 12, 2002) disclose, in addition to the above summary, the disclosure includes fraud protection provisions such as velocity controls, social security checks, and scans. It claims to have the further flexibility to differentiate between "first time" consumer usage and those limits otherwise assigned to "known" consumer accounts. Additionally, there is not need for the system to retain the consumer's check after verification.

Weiner, S., *Electronic Payments in the U.S. Economy: An Overview*, Federal Reserve Bank of Kansas City, Economic Review—Fourth Quarter 1999 discloses an overview of e-payments as they exist at that point in time in the U.S., including cash and check usage, credit and debit cards, wire transfers and ACH transactions, and e-money.

Curley, B, *First Union Division Offers Check Processing At POS*, Bank Systems+Technology, vol. 36, no. 5 p. 40 (May 1999) discusses First Union offering electronic check processing at the point of sale (POS), where consumer checks are scanned at the POS using a check reader, such as an IVI Checkmate unit, which sends the MICR data through a dial-up network to BankServ, a San Francisco-based check processor. BankServ compares the check information against negative databases like Deluxe's SCAN. The cashiers are notified within seconds if a check comes up bad; otherwise, BankServ sends the item for payment via ACH. Consumers receive a canceled check back at the POS, except for the first time they use a check for payment, when it is retained as a source document for the bank.

It would be advantageous to provide a system and method that ensures that every item eligible for ACH conversion is converted and collected successfully.

It would further be advantageous to eliminate administrative return processing resulting from the lack of MICR line standardization.

It would further be advantageous to provide a system and method that provides an ACH directory of the tens of thousands of routing and transit (R/T) numbers which identifies which R/T numbers are eligible for conversion, the R/T number and account conversion parameters, the formats of the on-us MICR line, and the ability to correct originated transactions.

It would further be advantageous to store notifications of change that are sent by receiving financial institutions to update future originated transactions.

It would further be advantageous to design a complete administrative return processing technique that allows for correcting and re-originating items (repair and re-originate converted ACH transactions) on behalf of customers without having the customers work on the return and store the repaired transaction data to update future originated transactions.

SUMMARY OF THE INVENTION

A technique is provided for automatically converting checks to ACH debits. The process is a two-part process in which the MICR line in a check is read at the point the check is presented and a decision is made if the check can be converted to an ACH debit. The decision is made by applying various rules. If the system is unable to convert the check to an ACH debit, then the check is processed as a normal check. If a decision is made that the check can be processed as an ACH debit, then the MICR line is parsed for the financial institution which issues the check to create the ACH debit.

BRIEF DESCRIPTION OF THE DRAWINGS

FIG. 1 is a schematic diagram showing the flow of the express check conversion process according to the invention.

DETAILED DESCRIPTION OF THE INVENTION

A technique is provided for automatically converting checks to ACH debits. The process is a two-part process in which the MICR line in a check is read at the point the check is presented and a decision is made if the check can be converted to an ACH debit. The decision is made by applying various rules. If the system is unable to convert the check to an ACH debit, then the check is processed as a normal check. If a decision is made that the check can be processed as an ACH debit, then the MICR line is parsed for the financial institution which issues the check to create the ACH debit.

It should be appreciated that the terms truncate and convert, and their various forms are used herein interchangeably.

Check to ACH Conversion Overview

A preferred embodiment of the invention can be described by the following discussion of improvements to an existing check to ACH conversion process.

Customers (merchants, vendors, etc.) receive checks and other paper payment documents over the counter at retail point of sale or at a centralized lockbox location, deposit them, and wait up to 10 days for notification of returned items.

Point of sale (POS) is a widely decentralized environment burdened by high employee turnover rates and multiple equipment deployments. Checks accepted over the counter are usually subject to verification or guarantee by check services providers. These providers verify only the likelihood that sufficient funds are in the account to cover the check at the time it is accepted at POS. Other ineligible items including money orders, travelers checks, etc. must be deposited rather than truncated.

Retail lockbox is currently a two-pass environment. Check and other paper payments, each accompanied by a payment coupon, come into the lockbox and are run through high-speed sorting equipment. On the first pass, the mail is opened and information is captured from the check and coupon. On the second pass, checks are power encoded in order to create a cash letter for deposit. Lockbox customers typically rush to meet deposit deadlines at their local depository financial institutions.

A Preferred Process

A preferred embodiment of the invention provides a method and apparatus ensuring that ACH truncation (or conversion) works for customers from end to end. On the front end, software upgrades and conversion tables are provided to assist customers in identifying ineligible items and in correctly parsing check MICR line information. On the back end, ongoing maintenance is provided as new returns appear and responsibility is taken for managing administrative returns.

In Federal Reserve Routing and Transit Number database, there are over 55,000 valid routing/transit numbers. Generally, about 28,000 of these are active. Of the 28,000, approximately 26,000 accept ACH transactions. The claimed invention provides customers with the keys to parsing items successfully for ACH conversion. For items drawn on the approximately 2,000 financial institutions that do not accept ACH entries, the invention provides options to create and deposit drafts, thereby making a total electronic solution for customers.

Conversion Solutions

A preferred embodiment of the invention provides conversion solutions designed for use with all three ACH conversion applications, as follows. Refer to FIG. 2.

RCK. Electronic check representation (RCK) deals with converting consumer checks that have been returned for non-sufficient funds (NSF) or uncollected funds into ACH debits. Acting as the customer's ACH Originating Depository Financial Institution (ODFI), and according to a preferred embodiment of the invention, the financial institution receives the returns and applies conversion logic to truncate them into ACH debits. The preferred embodiment of the invention provides check truncation decision processing methodology, which provides updating with administrative return information allowing customers to collect payments successfully.

POS. Ten billion to 20 billion checks are written at point of sale annually. In a preferred embodiment of the invention, in the POS application, conversion logic is applied when a check is presented for payment. At the retail location, the cashier scans the check then calls for authorization. The check truncation decision processing logic resides on equipment at a centralized location rather than in the retail store. The cashier receives confirmation that the item can be converted to an ACH debit or, if it cannot, it must be deposited.

ARC or Lockbox. Approximately the same number of checks are mailed to lockboxes, or placed in drop-boxes, as are written at point of sale. However, in these situations, high volumes of checks are concentrated in one location. From a technology deployment perspective, a great need for check conversion exists and, consequently, great benefits can be realized in a lockbox application.

In the preferred embodiment, check truncation decision processing logic is applied to identify ineligible items at two points in lockbox processing: 1) the mail opening process where non-standard checks as well as money orders, travelers checks, and the like are identified and separated, and 2) at a first pass through data capture equipment control point when ineligible items should be pocketed as deposit vs. truncated items.

Mail opening equipment uses basic Yes/No logic to detect inconsistencies in check sizes and in MICR lines lengths. Mail opening equipment does not look at R/T numbers or MICR line detail. To enable customers to identify items ineligible for ACH truncation, the invention provides software upgrades to make mail opening equipment smarter by outsorting ineligible items. Then, check truncation decision processing is applied, such processing methodology developed and maintained by electronic check experts or expert system, for use in the information capture process to identify any ineligible items that are not caught in the mail sort. The processing information, which is programmed into the software that runs the equipment, is driven by a particular consumer's billing account number as well as the R/T number and account number from the check.

The check truncation decision processing methodology also provides the logic for parsing routines needed to correctly obtain the appropriate routing and transit number, account number, and check serial number information needed to create a successful ACH transaction.

Eliminating Administrative Returns

Change is a fact of life. Consumers change payment behaviors from checks to money orders to online payment services whose payments arrive at lockboxes as commercial checks. Credit unions change payable-through banks. Credit card companies begin using different R/T numbers, and their convenience checks begin flowing through.

Just as antivirus software is updated continuously to identify and halt newly invented computer viruses, check truncation decision processing system is updated continuously to identify and convert new exception items. To provide customers with such ongoing maintenance, the preferred embodiment of the invention provides automated interfaces that notify and update customer platforms for new items as they appear.

Maintenance takes place on three levels. From highest to lowest, these are:

Routing/Transit Number (Institutional Level)
Routing/Transit Number and Account Number
Consumer Billing ID (Consumer Level)

As customers encounter a new occurrence, the invention provides for taking the return item, examining the image, and determining what changes should preferably be made to re-originate the ACH transaction successfully. Thus, the burden of manual administrative return processing is off the hands of customers and any changes needed to be successful converting checks going forward are stored.

Benefits of Check Truncation Decision Processing Methodology

Following are some benefits of the Check Truncation Decision Processing Methodology according to the invention.

Operating Cost Reduction

When checks are converted to ACH debits at the lockbox, the number of passes through equipment decreases from two to one and operating expenses are cut in half. Checks need make only one pass through the sorting machines during which all information needed to create an ACH transaction is captured. There is no need to power encode the eligible checks because they will be converted to ACH entries.

Accelerated Cash Flow

Checks deposits are assigned same-day, one-day, or two-day funds availability, depending on their drawn-on banks. ACH debits receive next-day availability on all items.

Fraud Risk Reduction

ACH returns are received faster than check returns allowing the customer to apply risk and fraud avoidance technology in a timely manner. With checks, customers may not receive NSF detail for up to 10 days after the initial deposit. Credit card companies, for example, benefit from being able to quickly modify the amount of credit that will be extended to delinquent payers and charging late payment fees.

Simplified Reconciliation

The need for exception research is virtually eliminated. Financial institutions, such as Wells Fargo, supports the redepositing of the transactions as well as the integrity of the returns, taking all returns and matching them to originated transactions to provide the best information possible about each return. With matching logic, customers receive the best possible return data. One preferred embodiment of the invention uses Wells Fargo's proprietary matching logic and matches 99.6% of the returns to the original items. Without value-added matching logic, it has been found that only 86% of returns have completely accurate transaction information.

Simplified Consumer Reconciliation

The description of ACH payments on consumer account statements includes the name of the payee along with the check serial number, which does not appear when check payments are deposited. According to one embodiment of the invention, the correct check serial number is captured. Such capturing results in simplified account reconciliation for the consumer through less need for cross-referencing with check registers or duplicate checks copies, and fewer consumer payment inquiries.

Return Savings

Return costs for a check are in the $2 to $10 range versus $2 for an ACH item.

Redeposit Savings

It costs 33% less to redeposit an ACH return item than a check return, approximately $3 for a check vs. $2 for an ACH transaction. This becomes even more significant when considering that, for many customers, re-presentment of low-value items was not cost effective, so uncollected payments were simply written off. Now there is a cost-effective solution to represent low-value payments.

Increased Collections

Traditionally, checks that are returned for non-sufficient funds (NSF) or uncollected funds may be re-presented for collection once, unless RCK services are used. A consumer check that has been converted to an ACH entry may be re-presented twice for a total of three presentments. Each presentment collects 30%-60% of outstanding items.

Eliminated Check Storage

Prior to the Mar. 15, 2002 NACHA rule amendments, converted checks had been treated as Uniform Commercial Code (UCC) items. UCC retention requirements mandated that these items be stored for seven years. During the pilot period, the requirements were that the original check be retained for 90 days and an image of the check for seven years. As of Mar. 15, 2002, truncated checks are supposedly treated as Regulation E items. On such date, the storage requirement is eliminated and replaced with a forced destruction requirement which requires the destruction of the original source document within 14 days in order to prevent double depositing of paper and ACH items, and reducing operating expense.

Applicability to Other ACH Participants

The check truncation decision processing conversion solutions are applicable to all ACH conversion applications in which checks are used as the primary source document and, therefore, to virtually all ACH participants that accept checks for consumer payments. These solutions will improve transaction clearing and posting for all ACH files. Companies billing recurring payments, particularly, will benefit from the provided information parsing keys as their files need the fewer updates and modifications over time.

Remittance Processing with Check Conversion

This section describes Remittance Processing with Accounts Receivable Check Conversion, i.e. Express Check Conversion, according to one embodiment of the invention.

What is Check Conversion?

Paper checks received from consumers in payment of an account receivable, such as a credit card account, are converted to an electronic debit. The paper check is imaged and destroyed. The consumer sees detailed payment information on his or her bank statement.

Check Conversion Process

An embodiment of the invention is described with reference to FIG. 1, wherein FIG. 1 is a schematic diagram showing the flow of the express check conversion process. In one embodiment of the invention, a company mails a statement to a consumer (102). The consumer receives the invoice and conversion notification (104). The consumer mails a coupon with the corresponding check (106), on route to the remittance processing center. The consumer mail is delivered to the company or to its associated lockbox, where payments are received and processed (108). Then, the received and processed payments are sent to the company remittance processing center (110), which handles the following functionality:
- Converting eligible consumer checks
- Creating electronic file for converted items
- Depositing ineligible, paper checks at bank
- Managing storage and retrieval of images The associated financial institution handles the following (112):
- ACH file processing and settlement
- Account maintenance
- Returns handling
- Customer service It should be appreciated that the company remittance site opening mail and processing payments for the company may be located at the company itself or at third party site. Regardless, the company can decide with which financial institution it wants to deposit ineligible items. Such financial institution may be different than the ODFI. For example, while lockbox processing is done in Florida, it may be that Wells Fargo Bank is the ODFI for the ACH items. However, because Wells Fargo does not have any branches or vaults in Florida, the company can decide to deposit the ineligible items with a local Florida bank.

Remittance Processing Center

The Remittance Processing Center provides the following functionality:
- Open envelope
- Image payment
- Determine payment amount
- Associate payment with customer account
- Determine if check is eligible for conversion Eligible Items Eligible items include:
- Consumer checks only
- Such checks having a pre-printed serial number
- Such checks completed and signed by consumer
- Such checks of any dollar value Ineligible Items Ineligible items include:
- Corporate checks
- Third party checks
- Credit card checks
- Cashier's checks and money orders
- Government checks
- Checks payable in a foreign currency
- Checks containing an auxiliary on-us field Sorting Criteria Sorting criteria include:
- The Customer database
  - Business customer
  - Opt out customer
- Size of check
  - 6" denotes a consumer check
  - Larger size usually denotes a business check
- Routing transit number on check
  - ACH acceptor or not
- Format of MICR line
  - Existence of auxiliary on-us field Sorting Function Checks are sorted as follows:
- Eligible for conversion:
  - Add to "Perfect Parsing" file, described herein below.
- Ineligible for conversion:
  - Deposit in bank.

Impact of Sorting Decision

Following are described impacts of decisioning, as follows:
- Accurate decisioning is essential to success.
- Inaccurate decisioning results in Administrative Returns:
  - The RDFI (receiving bank) is not able to process the ACH debit transaction.
  - They return the transaction to the ODFI (originating bank).
  - The ODFI returns it to the originating party for disposition (most likely, repair and re-origination)

Sample MICR Formats

Two MICR myths include the following:
- Bank account information is easily identifiable
- Check serial numbers are easily identifiable However, in reality, check conversion is complex, as can be inferred from the following sample MICR formats:
- A211371078A 88 9999999C 5847
- A324377516A99999999999 3C 4195
- A121101037A6622D99999999C09
- A231382306A 02 9999999C16-1712
- A121000248A322-9999 999999C
- A322079353A 999999999C5283 10
- A073901851A 999D999C10 0623
- A121301028A 1234D9999C 2334

Parsing the MICR Line

The following information provides guidelines and constraints for parsing the MICR line:
- The "On-Us" field of MICR line on a check contains 20 characters.
- ACH account format permits only 17 characters.
- MICR may include a transaction ("TT") code which may or may not be a valid field for an ACH transaction.
- The placement of the account number, serial number, and transaction code in the MICR line is not standard across the banking industry.
- ACH transactions may require adding or removing leading zeros in the account number.
- Credit union share drafts often require R/T and account number reformatting to process as an ACH item.

MICR Parsing Options
  Some options for parsing are provided as follows:
    Using a provided Decisioning Table to make decisions, parse within a customer's remittance processing environment and create a NACHA formatted file; or
    Decision within the customer's remittance processing environment and create a "Perfect Parsing" data file and transmit to the financial institution facility for parsing via a Decisioning Table, such as an exemplary Decisioning Table described below; and
    Use a third party software Decisioning Table, such as U.S. Dataworks, and create a NACHA formatted file.

An Exemplary Decisioning Table
  An Exemplary Decisioning Table includes the following features:
    A database of bank R/T numbers and account number and MICR parsing formats.
    Daily, weekly, monthly analysis of all of a financial institution's ACH origination, return, NOC transaction data, including finding patterns.
    Means for Notifications of Change (NOCs) being automatically loaded and used to correct future originated transactions.

Using the Decisioning Table
  Some ways for using the Decisioning Table are provided as follows:
    Install the financial institution facility's database in the customer's platform and use it to determine eligible and ineligible items. Then send the resulting data file to the financial institution's facility, which then parses the data and creates and processes a NACHA formatted file containing the customer's transactions.
    Install the financial institution facility's database in the customer's platform and use it to determine, eligible and ineligible items. Then, the customer sends the full MICR line, amount, and the customer reference number to the financial institution facility, which then performs enhanced modifications and corrections, such as adding or deleting leading zeros, and credit union conversion modifications, and the like, and as discussed in detail herein.
    Use third party software, such as U.S. Dataworks, to convert items and send the resulting NACHA formatted file to the financial institution's facility for further processing, as described in detail herein below.

Installing Database in Customer's Platform
  The following provides a way for successfully installing the decisioning table (database) in the customer's platform:
    Incorporate the database into the customer's software program to assist in determining which checks are eligible for conversion.
    Updating the database weekly or monthly from a transmitted file sent from the financial institution's facility to the customer.

"Perfect Parsing" File
  Following is a way of creating and using the Perfect Parsing file:
    Capture the R/T number field, the on-us field, and determine the amount of checks eligible for conversion.
    Send the "Perfect Parsing" file to the financial institution without editing the transaction data.
    Let the financial institution parse the data, and:
      Create and process a NACHA formatted file for eligible conversion items.
      Create paper drafts for ineligible items.

It should be appreciated that the resulting NACHA formatted file will have the lowest Possible administrative return rate, because, among other things
  1) the decisioning is correct; and
  2) the back-end ACH formatting can be performed after the NACHA file is received.

Third Party Software
  Following describes a way to incorporate third party software into the check conversion decisioning process:
    It should be appreciated that the Decisioning Table can still add value to files already parsed by other's software.
    The provided R/T data is more current than the data available from "official" bank tables, so R/Ts that are out-of-date can be corrected.
    The effectiveness of the provided Decisioning Table in correctly parsing account numbers is somewhat reduced because parsing eliminates some data from the MICR line that may otherwise be essential.
    Leading zeros to account numbers are still added/removed, thereby reducing administrative returns.
    Credit union conversion modifications are provided.

Process Flow—Ineligibles
  Following are guidelines provided for the ineligibles process flow:
    Power encode the ineligibles with the given dollar amount.
    Due to the lower volume of checks deposited, special sorting of checks may no longer be needed.
    Depending on the mix of business/consumer checks, decide possibly to deposit the checks without encoding the dollar amount.
    Deposit at bank.

Process Flow—Eligible Checks
  Following are guidelines provided for the eligibles process flow:
    Mark checks void on transport (optional).
    Confirm that images are readable.
    Transmit file to the financial institution for processing of ACH debits.
    Destroy checks that have been converted to ACH debits within a predetermined number of days, e.g. 14 days, of the settlement date.

An Exemplary Express Check Conversion Embodiment

Maintained Tables
  In a bank's directory, such as Wells Fargo Bank Directory, containing over 60,000 routing and transit numbers, the following is provided. The preferred table identifies: active versus retired R/T numbers, ACH participating R/T numbers, credit union conversion identification and translation information, check conversion eligibility flags, invalid account lengths, minimum and maximum account lengths, parsing format codes, and trim lead zero indicator.
  MICR Translation Table. The table contains a list of masks for all of the possible MICR on-us field variations with the corresponding location of the account number and check serial number. Some masks are duplicated on the table with parsing format identifiers that match options available on the Bank Directory.
  Transaction Management Database. This table stores all originated check conversion transactions and corresponding transaction modifications needed for future transactions. The transaction modifications are a result of received notifications of change and administration (admin) return processing.

Process Flow

The financial institution facilitator provides initial and ongoing files of ineligible R/T numbers to customers.

Customers Utilize an ineligible R/T numbers list to sort checks into eligible and ineligible items. Ineligible items are encoded and deposited as checks. Due to the NACHA Rules, the customer also must identify checks containing an auxiliary on-us field as ineligible items.

For eligible items, customers format an Perfect Parsing file containing a record for each check. The file format consists of 9 byte R/T number, 20 byte MICR on-us field (including all spaces, dashes, and symbols), 10 byte dollar amount, and 22 byte client reference number.

The financial institution processes the Perfect Parsing file and creates a NACHA file of transactions for origination. Each record in the Perfect Parsing file is matched to a mask on the MICR Translation Table to identify the correct location of the account number and check serial number used for the NACHA formatted file. The parsing format for each R/T number located on the Bank Directory is also used to identify which mask to be used in the case of duplicate masks.

An internal processing system is benchmarked at six million items in and out of the ACH warehouse per hour, which is needed to support the high volume of check conversion activity.

In addition to the creation of the NACHA file, items are automatically drafted as needed to collect items from R/T numbers that may have changed their ACH participation status after the customer had loaded their ineligible R/T numbers list.

Generally speaking, there are two reasons drafts are created for institutions:

1) The institutions have changed their participation status; and
2) The credit union conversion logic currently reflects that the credit union doesn't accept ACH. For example, if a payable through bank processes for 100 credit unions, all the sharedrafts will have the same payable through R/T number, but a few of the credit unions may not accept ACH.

As the NACHA files are entered into the financial institution's ACH warehouse, the files are identified as either on-us items, or transit items. On-us items are distributed to the financial institution's posting application, and transit items are distributed to the ACH Operators for delivery to the appropriate receiving financial institutions.

Several times during the day, the financial institution receives returns from originated electronic check transactions. Once per day, it processes all the returns, sorting and distributing the fatal return items to customers and preparing settlement. All Notifications of Change (NOC) are loaded into a Transaction Management Database. Based on a predetermined list of return reason codes, admin returns are also sorted and distributed to a Unix-based server for ACH operation staff to repair and re-initiate corrected entries (admin return processing).

The admin return processing system allows viewing all details of the original transaction and the return, for example, by a staff or expert system. Each return is matched to the original item to allow the ability to validate the return detail information. All of the transaction information, as well as an image of the check is used to repair the item. The following ability is provided:

Correct and re-originate an ACH item
Correct and draft an item
Dishonor the ACH return
Take a copy of the image to produce an image replacement document All operator repairs are loaded into a Tran saction Management Database to be used for future originated transactions, thereby eliminating future admin returns.

MIS Reporting

To manage the on-going maintenance of the Bank Directory, ACH operations provides daily, weekly, and monthly reports produced which highlight origination detail and rates, return detail and rates, and admin return detail and rates, both by originating customer and by receiving financial institution.

The Bank Directory is updated with a Federal Reserve ACH participant listing and by a Thomson directory for bank name, address, and contact information.

Exemplary NOC Logic

The preferred embodiment of the invention uses NOCs received for Check Conversion transactions to modify the (R/T)/Account/Transaction code for future Check Conversion Transactions, discussed as follows.

It should be appreciated that this NOC logic is only applied for valid NOCs received for check conversion transactions, such as any of: routing and transit number changes, account number changes, transaction code changes, and the like.

When a check conversion transaction is received from a check conversion customer, perform the following steps:

Apply the existing check conversion logic for modifying the (R/T)/account/check/transaction code number;
Check if a matching NOC was received in the NATBCCHG database. If there is a match, use the NOC information to set the R/T, Account, and Transaction code.

It should be appreciated that If the (R/T)/Account/Transaction code is modified because of a previously received NOC, write a record to the NOC FILE with "WFBDPN" in the descriptive date field to indicate the code was modified because of a previous NOC. These are not written to the final NOC file used to send out NOCs, but are used to add a record to NATBCCHG. Therefore, if a RETURN or NOC is received later for a transaction because of a previous NOC, such RETURN or NOC appears on the new relevant report.

If returns are received for a transaction in which the RT/Account/Transaction code is modified because of a previous NOC, that NOC record is deleted from NATBCCHG so that future transactions for that RT/Account are not altered.

If a check conversion transaction was not received for thirteen months for a matching RT/Account, then such transaction from NATBCCHG is removed.

It should be appreciated that reports include all customer provided transaction detail in addition to the resulting NACHA formatted transaction detail.

It should be appreciated that the "CODE" is "N/A" when the account is modified from our check conversion logic but did not create an NOC. The "CODE" is "PN" when the (R/T)/account/transaction code is modified because of a previous NOC, but a new NOC is not sent.

It should be appreciated that the invention allows inquiries, updates, deletes, and adds to the NOC records in the NATBCCHG database to alter how the RT/Account/Transaction code is changed for check conversion transactions.

Below, Table K is an example NOC report according to the invention.

TABLE K

| TOP OF REPORT | | | | | | |
|---|---|---|---|---|---|---|
| REPORT H875-1<br>LOCATION: XXXX<br>DATES: MM/DD/YY–MM/DD/YY | | AUTOMATED CLEARING HOUSE<br>CHECK CONVERSION WFBD RETURNS | | | SYS DATE: MM/DD/YY<br>SYS TIME: HH:MM<br>PAGE: XXXX | |
| CUSTOMER R/T/<br>ORIGINATED R/T | CUSTOMER ACCTS#/<br>ORIGINATED ACCT# | CUSTOMER CK#/<br>ORIGINATED CK# | CUSTOMER TRAN<br>ORIGINTED TRAN | RET/NOC<br>DATE | CODE | NOC INFO |
| XXXXXXXX | XXXXXXXXXXXXXXXX | XXXXXX | XX |  | XXX |  |
| XXXXXXXX | XXXXXXXXXXXXXXXX | XXXXXX | XX | MM/DD/YY |  | XXXXXXXXX |
| XXXXXXXX | XXXXXXXXXXXXXXXX | XXXXXX | XX |  | XXX |  |
| XXXXXXXX | XXXXXXXXXXXXXXXX | XXXXXX | XX | MM/DD/YY |  | XXXXXXXXX |
| XXXXXXXX | XXXXXXXXXXXXXXXX | XXXXXX | XX |  | XXX |  |
| XXXXXXXX | XXXXXXXXXXXXXXXX | XXXXXX | XX | MM/DD/YY |  | XXXXXXXXX |
| TOTAL WFBD RETURNED ITEMS XXXXX | | | | | | |
| END OF REPORT | | | | | | |

An Exemplary Express Check Conversion Design—Technical Requirements and Detailed Design Objective The objective of this endeavor is to enhance the support of Check Conversion transactions, effective with the NACHA 2002 release.

Background

ARC transactions used for Check Conversion are part of the NACHA 2002 release on Mar. 15, 2002. Not all checks are eligible for check conversion. In order to make better decisions up front on the eligibility, this embodiment of the invention allows maintaining information at the bank R/T level to determine whether the check is allowed in the check conversion process.

This database of check conversion decision information is made available to check conversion originators to allow better up front-decisions in determining whether the truncate.

This embodiment of the invention also allows reporting on the volumes.

An Administrative Returns process allows correcting any check conversions that get returned by comparing the actual image to the check conversion transaction created.

It should be appreciated that in the industry, it is imperative that high speed processing be retained with check conversion. The preferred embodiment of the invention retains such high speed processing with check conversion because the invention provides a "thin" file of ineligible R/T numbers.

Check Conversion Decision Database Requirements

TDB1—Eligibility Indicator by R/T Number

TDB1 is an eligibility indicator required for each R/T number to indicate whether the routing and transit number will accept truncated ACH items or MICR drafts.

TDB1 contains logic handling the case when even though an R/T number can accept ACH, it may not accept converted checks, and when this is the case, the R/T number is part of the ineligible R/T number file.

If the R/T number is not eligible, a reason code is maintained to indicate the reason that this R/T number does not accept the truncated ACH/MICR items.

TDB2—Ineligible Account Number Length

For R/T numbers that are eligible for truncated ACH and MICR items, an ineligible account number length is defined. Such allows setting a minimum account number length that is not valid for truncated ACH or MICR items. For example, if this value is set to 13, account numbers with a length 13 or more are not eligible for check conversion transactions. Lengths less than 12 are allowed.

TDB3—Minimum/Maximum Account Number Length

A minimum and maximum account number length can be specified for R/T numbers that accept check truncation transaction. There is a minimum and maximum account number length.

If the length of the account number received on a check conversion transaction is less than the minimum account length defined, then lead zeros are added to get to this minimum length.

If the length of the account number received on a check conversion transaction is greater than the maximum account length defined, then the account number is truncated to get to this maximum length.

Such minimum and maximum account number length fields are also used in conjunction with ineligible items' account length to determine whether or not to modify such account length or use the action code for the ineligible length.

TDB5—Truncate Leading Zeros Indicator

An indicator at the R/T number level is provided to determine whether leading zeros should be truncated for this R/T number. If set to "Y", then leading zeros are truncated. However, if the truncated account length is less than the minimum account number length defined for this R/T number, then lead zeros are used to get to the minimum account number length.

TDB6—Parsing Formats

A parsing format code is used to indicate how the MICR line of a check should be parsed for this R/T number. This code is needed by the originator facility that is doing the actual conversion.

Some sample formats are as follows:
00—Unknown format
01—*R/T*account number/check serial number
02—*R/T*check serial number account number
03—*R/T*check serial number account number/account number (use numbers after on-us auxiliary field to create account number)
04—*R/T*check serial number account number/account number (do not use numbers after on-us auxiliary field to create account number)
05—*R/T*account number/account number check serial number (use numbers after on-us auxiliary field to create account number)

06—*R/T*account number/account number check serial number (do not use numbers after on-us auxiliary field to create account number)

07—*R/T*00000account number/check serial number (various number of leading zeros before account number, use zeros to create account number)

08—*R/T*00000account number/check serial number (various number of leading zeros before account number, do not use zeros to create account number)

09—*R/T*account number/check serial number (SPECIAL EDIT: If the check serial number is six digits, then the last two digits are stripped from the check number without a NOC)

10—*R/T*account number/check serial number (SPECIAL EDIT: If the check serial number is 6 digits, then the first two digits are stripped from the check number without a NOC)

11—*R/T*account number/check serial number (SPECIAL EDIT: If the check serial number is six digits, then the first two digits are stripped from the check number and placed at the end)

Check Conversion Decision Processing Requirements

This section only addresses the technical design for requirements of a first phase.

TDB7—Invalid Account Length Action Code

An action code for Invalid Account Length for instructing how to process transactions whose-account length is greater than or equal to the Invalid Account Length. Such Action Code can be "R" to reject the transaction or "D" to draft it via MICR.

Design Overview

See JCL section below for new JCL streams.
See Scheduling section below for Scheduling changes.

Project Test Libraries

The following TSO libraries are used to create and store all new JCL, Procs, and Control Cards needed for both unit testing and system testing.

JCL Library
TSTNA.#TEAMA.JCLLIB

Proc Library
TSTNA.$PD3355A.PROCLIB

Control Card Library
TSTNA.$PD3355A.CNTLCARD

Dataset Naming Conventions

Whenever possible, all datasets used for testing should follow the following dataset naming standards:
All datasets beginning with TSTNA are test datasets.
All datasets beginning with PRDNA are production datasets.
An optional third qualifier may be added to identify the program or job that the dataset is created or used in.
Productions dataset names follow naming standards defined in the ACH phase 2 standards document.

JCL

New JCL
ZNACHKTB
Such is a weekly job executed on Saturdays for executing PROC NACHKT to build the new generation of the Check Conversion Parameter File.
ZNAD300A
Such is a job to produce the Check Conversion Problem Report by R/T on a daily, weekly, and monthly basis. It executes proc NAD300. There are preferably three SCHID's: one for daily, one for weekly, and one for monthly.

ZNAD310A
Such job produces the Check Conversion Problem Report by File ID/Company ID on a daily, weekly, and monthly basis. It executes proc NAD310. There preferably are three SCHID's: one for daily, one for weekly, and one for monthly.

ZNAD320A
Such job produces the Check Conversion Detail R/T Report on a daily basis. It executes proc NAD320.

ZNAD330A
Such job produces the Check Conversion Detail File ID/Company ID Report on a daily basis. It executes proc NAD330.

ZNAS400C
Such is a monthly job to produce the Monthly Availability Report. It executes proc NAS400.

JCL Changes
ZNAOA03A
Such job selects records from a preexisting NATBCPNY and builds a dataset to download information to UNIX. The LRECL=797 is increased on both job steps to accommodate the additional field added to the select. The LRECL=968 is increased by two to allow the delimiter (|)

ZNAOA04A
Such job selects records from NATBFILS and builds a dataset to download information to UNIX. The LRECL=450 is increased on both job steps to accommodate the additional field added to the select. The LRECL=579 is increased by two for the new field and delimiter.

ZNAOA12A
Such job selects records from NA4VCMPR and builds a dataset to download information to UNIX. The LRECLs preferably are changed to add the Credit Union Conversion and Check Conversion parameters.

Scheduler

New Scheduler Jobs
ZNACHKTB
This is a weekly job executed on Saturdays that executes PROC NACHKT to build the new generation of the Check Conversion Parameter File.

ZNAD300A
Such is a daily job to produce the Check Conversion Problem R/T Report

ZNAS400C
Such is a monthly job to produce the Monthly Availability Report for check conversion customers.

Procs

New Procs
NACHKT
Such PROC is used to execute the new program NAD0110 to build the new generation of the Check Conversion Parameter file.

NAD300
Such PROC executes NAD0130 to produce the Check Conversion Problem R/T Report by RT.

NAD310
Such PROC execute a NAD0310 to produce the Check Conversion Problem R/T Report by File ID/Company ID.

NAD320
Such PROC executes NAD0315 and NAD0320 to produce the Check Conversion Detail Report by R/T.

NAD330

Such PROC executes NAD0315 and NAD0330 to produce the Check Conversion Detail Report by File ID/Company ID.

NAS400

Such PROC executes NAS0400 to produce the Monthly Availability Report.

Control Cards

New Control Cards

NAD300S1

Such control card sorts records created by NAD315 for NAD300 by R/T to build the Check Conversion Problem Report by R/T.

NAD310S1

Such control card sorts records created by NAD315 for NAD310 by R/T to build the Check Conversion Problem Report by File ID/Company ID.

NAD320S1

Such control card sorts the records created by NAD315 for NAD320 by R/T to build the Check Conversion Detail Report by R/T.

NAD330S1

Such control card sorts the records created by NAD315 for NAD330 by FILE ID/Company ID to build the Check Conversion Detail Report by File ID/Company ID.

Control Card Changes

NANCCPNY

Such control card selects the NATBCPNY fields for sending to the UNIX. Add the new columns to the SELECT statement. Add FADMRT as the last select field.

NANDCPNY

Such control card has the output statements for building the NATBCPNY file to send to the UNIX. A new statement is added at the bottom for outputting the new FADMRT field.

NANDAH03

Such control card has the NDM statements for sending the NATBCPNY information to the UNIX. The LRECL increases from 968 to 969.

NANCFILS

Such control card selects the NATBFILS fields for sending to the UNIX. Add the new columns to the SELECT statement. Add FCTIND as the last select field.

NANDFILS

Such control card has the output statements for building the NATBFILS file to send to the UNIX. A new statement needs to be added at the bottom for outputting the new FCTIND field.

NANDAH04

Such control card has the NDM statements for sending the NATBFILS information to the UNIX. The LRECL increases from 579 to 580.

NANCCMPR

Such control card selects the NA4VCPNY fields for sending to the UNIX. Add the new columns for Check Conversion. Send the credit union conversion fields.

Add CCTIND, QCTIAL, QCTMNL, QCTMXL, CCTPFM, FCTTLZ, CCTILA, CUIDPOS, CREDITUNID, IRTCCU, CUACCOUNTFLG, CRUNIONPRCS, CURTTFLG.

NANDCMPR

Such control card has the output statements for building the NA4VCMPR file to send to the UNIX. New statements are added at the bottom for outputting the additional fields CCTIND, QCTIAL, QCTMNL, QCTMXL, CCTPFM, FCTTLZ, CCTILA, CUIDPOS, CREDUTUNID, IRTCCU, CUACCOUNTFLG, CRUNIONPRCS, CURTTFLG.

NANDAH12

Such control card has the NDM statements for sending the NA4VCMPR information to the UNIX. The LRECL increases for the new fields.

NAG150CU

Such control card is used for selecting Credit Union NOCs from NAR562's NOCFILE. It is preferably modified for the C99 NOC's because neither FNOCA nor FNOCB are likely to be turned on. Select records with WFBD as the descriptor.

Files

New Files

PRDNA.Z170001A.SCHKTPRM.R0008(0)

This is a GDG to contain the most recent copy of the Check Conversion Parameters defined by segment WY25. The last three generations preferably are kept.

Such file is built on a weekly basis with a new job.

PacBase Elements

New Elements

FCTIND

Check Conversion indicator, PIC X(1). Values of "Y" for Yes. All other values are NO.

CCTIND

Check Conversion indicator, PIC X(1). Values of "Y" for Yes. All other values are NO.

QCTMNL

Check Conversion minimum account length. PIC 9(2). Also create child QCTMNC with internal format 9(2) for putting it in an output file for the customer.

QCTMXL

Check Conversion maximum account length. PIC 9(2). Also create child QCTMXC with internal format 9(2) for putting it in an output file for the customer.

FCTTLZ

Check Conversion Truncate Lead Zeros indicator, PIC X(1). Values of "Y" for Yes and "N" for No.

CCTPFM

Check Conversion Parsing Format, PIC 9(2). Also create child CCTPFC with internal format 9(2) for putting it in an output file for the customer.

QCTIAL

Check Conversion Invalid Account Length, PIC 9(2). Also create child QCTIAC with internal format 9(2) for putting it in an output file for the customer.

CCTNOC

This is a code to indicate the reason why the account number was changed as a result of the Check Conversion parameters. Pic is X(1). Values:

SPACE=Not affected by check Conversion parameters
A=Changed due to MIN/MAX account length parameters
B=Changed due to Trim Lead Zero option
C=Forced to MICR because member bank does not process ACH

FADMRT

Admin Returns Indicator, PIC X(1). Values of "Y" for Yes and "N" for No.

CCTILA

Check Conversion Invalid Length Action Code, PIC X(1). Values of "R" to reject the item or "D" to draft using MICR.

CDLYMO

Daily or Monthly indicator for report programs.

QCTMNX

Check Conversion minimum account length display. PIC 9(2). Also create child QCTMNC with internal format 9(2) for putting it in an output file for the customer.

QCTMXX

Check Conversion maximum account length display. PIC 9(2).

CCTPFX

Check Conversion Parsing Format Display, PIC 9(2).

QCTIAX

Check Conversion Invalid Account Length Display, PIC 9(2).

PacBase Segments

New Segments

WY25—Check Conversion Parameter File

This is a new segment that defines the record layout of the Check Conversion Parameter File that is created on a weekly basis and sent to originators of Check Conversion Parameters.

The following elements preferably make up this file:
IRTC—Bank RT with Check Digit—PIC 9(9)
NBNK50—Bank Name—PIC X(50).
CCTIND—Check Conversion Indicator (Y/N)—PIC X(1)
QCTIAL—Invalid Account Length—PIC 9(2)
QCTMNL—Minimum Account Length—PIC 9(2)
QCTMXL—Maximum Account Length—PIC 9(2)
FCTTLZ—Trim Lead Zeros Indicator—PIC X(1)
CCTPFM—Parsing Format Code—PIC 9(2)
CBKST—Bank Status PIC X(1)
FMSPL—ACH Member Status PIC X(1)

WY27—Report Program Parm Card

This is a new segment that defines the linkage section PARM card to be passed to the NAD300 and NAD310 report programs.

The following elements preferably make up this file:
IREG—Region
ILCTNX—Location
CDLYMO—Daily, Weekly, Monthly code
DFMTI—Overriding from date
DFMTI2—Overriding to date WY29—Check Conversion Detail Report Work File This is a new segment that defines the work file created by NAD315 to be used by report programs NAD320 and NAD330.

The following elements should make up this file:
CADNOC—Admin/NOC code
IRTC—R/T number with check digit
IACCT—Account number
IFILE—FILE ID
ICPNY—COMPANY ID
IIND—Individual ID (Has serial number
CTRANA—ACH transaction code
CRESR1—Return/NOC 3 digit code Segment Changes

GA20

This segment is for NATBCMPR and needs to have CCT-IND, CCTRSN, QCTIAL, QCTMNL, QCTMXL, FCTTLZ, CCTPFM, and CCTILA.

GA22

This segment is for NATBCMPR and needs to have CCT-IND, CCTRSN, QCTIAL, QCTMNL, QCTMXL, FCTTLZ, CCTPFM, and CCTILA. The -DBE entries should point to GA20. This is for NA1 VCMPR.

GA23

This segment is for NATBCMPR and needs to have CCT-IND, QCTIAL, QCTMNL, QCTMXL, FCTTLZ, CCTPFM, and CCTILA. The -DBE entries should point to GA20. This is for NA2VCMPR.

GA24

This segment is for NATBCMPR and needs to have CCT-IND, QCTIAL, QCTMNL, QCTMXL, FCTTLZ, CCTPFM, and CCTILA. The -DBE entries should point to GA20. This is or NA3VCMPR.

GA25

This segment is for NATBCMPR and needs to have CCT-IND, QCTIAL, QCTMNL, QCTMXL, FCTTLZ, CCTPFM, and CCTILA. The -DBE entries should point to GA20. This is NA4VCMPR.

AG00

This segment is used for common control information. Currently it contains the NOC indicators for R/T change (FNOCA) and Account number change (FNOCB). At the bottom of this segment, add CCTNOC to contain the NOC Check Conversion indicator.

GA5C

This segment is for NATBFILS and needs to have FCTIND added to the bottom.

GA5D

This segment is for NATVFILS and needs to have FCTIND added to the bottom and the -DBE to point to GA5C.

GA5A

This segment is for NATBCPNY and needs to have FAD-MRT added to the bottom.

GA5B

This segment is for NATBCPNY and needs to have FAD-MRT added to the bottom and the -DBE to point to GA5A.

DD1T

This segment is the audit log descriptions for GA5B and needs "ADM RETURN"added for a description.

DF1T

This segment is the audit log values for GA5B and needs FADMRT added to the bottom.

WS38

This segment is for the NAC210 DB2 work area for the ACF setup report and needs FCTIND and FADMRT added to the bottom.

DD5D

This segment is the audit log descriptions for GA5D and needs. "CHK TRUNC" added for a description.

DF5D

This segment is the audit log values for GA5D and needs FCTIND added to the bottom.

GA1J

This segment needs a key added for IRTVI to be used as a key for NAD300 Check Conversion report when reading NATVRHST.

DD2A

This segment is the audit log descriptions for GA23 and needs the Check Truncation fields added.

DF2A

This segment is the audit log values for GA23 and needs the Check Truncation fields added.

DB2

New DB2 Tables

None.

DB2 Table Changes

NATBCMPR—Bank File Directory

The new Check Conversion Database Decision fields that are based on the BANK R/T are kept in the Bank File Directory table. The following new rows are to be added to this table:

CCTIND—Check Conversion Indicator—X(1)

QCTIAL—Check Conversion Invalid Account Length—PIC S9(3) COMP-3

QCTMNL—Check Conversion Minimum Account Length—PIC S9(3) COMP-3

QCTMXL—Check Conversion Maximum Account Length—PIC S9(3) COMP-3

FCTTLZ—Check Conversion Truncate Lead Zeros Indicator—PIC X(1)

CCTPFM—Check Conversion Parsing Format—PIC 9(2)

CCTIALC—Check Conversion Invalid Account Length Action Code—PIC X(1)

Also update the views NA1VCMPR, NA2VCMPR, NA3VCMPR, and NA4VCMPR. SPUFI to initialize table:

```
UPDATE NA001.NATBCMPR
SET CCTIND='Y',
    QCTIAL=14,
    QCTMNL=1,
    QCTMXLL=13,
    FCTTLZ='N',
    CCTPFM=00,
    CCTILA='D'
WHERE ACHMBRFLG = 'Y'
UPDATE NA001.NATBCMPR
SET CCTIND='M',
    QCTIAL=1,
    QCTMNL=0,
    QCTMXLL=0,
    FCTTLZ='N',
    CCTPFM=00,
    CCTILA='R'
WHERE ACHMBRFLG < 'Y'
NATBFILS - ACF File Level
```

A new Check Conversion indicator in the ACF at the File ID level is required to indicate this customer is a Check Conversion customer.

FCTIND—Check Conversion Indicator—X(1)

A SPUFI is used to initialize the value to "N".

Also update view NATVFILS.

NATBTFIL—ACF File Level

A new Check Conversion indicator in the ACF at the File ID level is required to indicate this customer is a Check Conversion customer FCTIND—Check Conversion Indicator—X(1)

A SPUFI will be used to initialize the value to "N".

Also update view NATVTFIL.

NATBCPNY—ACF Company Level

A new Admin Returns indicator in the ACF at the Company ID level is required to indicate this customer is an Admin Returns customer FADMRT—Admin Returns Indicator—X(1)

A SPUFI is used to initialize the value to "N".

Also update view NATVCPNY.

NATBTCPN—ACF Company Level

A new Admin Returns indicator in the ACF at the Company ID level is required to indicate this customer is an Admin Returns customer FADMRT—Admin Returns Indicator—X(1)

A SPUFI is used to initialize the value to "N".

Also update view NATVTCPN.

Batch Programs

New Batch Programs

NAD120—Build Check Conversion Parameter file

This is a new program to read through the Bank File Directory (NATBCMPR) and build a file of the Check Conversion Parameters. The output segment is WY25 and it builds the plus-one generation of a new GDG PRDNA.Z170001A.SCHKTPRM.R0008.

NAD300—Check Conversion Problem Report by R/T

This is a new program to print out a Check Conversion Problem Report by R/T. It is printed on a DAILY, WEEKLY, and MONTHLY basis called by three separate jobs.

The returns and NOCs for ARC, POP, XCK, and RCK transactions are processed by this report to provide the number of returns and NOCs for each R/T.

Pacbase RT1 is used to produce this report.

NAD310—Check Conversion Problem Report by File ID/Company ID

This is a new program to print out a Check Conversion Problem Report by File ID/Company ID. It is printed on a DAILY, WEEKLY, and MONTHLY basis called by three separate jobs.

The returns and NOCs for ARC, POP, XCK, and RCK transactions are processed by this report to provide the number of returns and NOCs for each R/T.

Pacbase RT2 is used to produce this report.

NAD315—Check Conversion Detail File Builder

This is a new program to extract the return/NOC information to build a file that can be sorted for the Detail Reports created by NAD320 and NAD330.

NAD320—Check Conversion Detail Report by R/T

This is a new program to print out a Check Conversion Detail Report by R/T. It is printed on a DAILY basis.

Pacbase RT3 is used to produce this report.

NAD330—Check Conversion Detail Report by File ID/Company ID

This is a new program to print out a Check Conversion Detail Report by File ID/Company ID. It is printed on a DAILY basis.

Pacbase RT4 is used to produce this report.

NAS400—Monthly Available Report

This is a new program to create the Monthly Availability Report. A new monthly availability report by ACH COID is created for check conversion customers. The fields on the report include processing date, processing time total items, total dollars, RDFI, item count, and availability (0=sameday, 1=next day, 2=2 day).

The schedule log (SCHL) is used to read the information needed for this report.

Batch Program Changes

CEACH018—MICR Drafts

This program is modified to include the check number on MICR DRAFTS for check Conversion transactions this is for the DEBIT transactions.

At L070864, if this is not a credit transaction and are processing a Check Conversion transaction (SAVESEC=ARC, RCK, XCK, or POP), move the check, number (MCR967) from the '6' record to 1(R11) to be immediately after the '/'. Ignore lead zeros.

Below MCR953 there is an unlabeled CL3 statement. Put a tag "MCRSEC" on this line to reference the standard entry class code.

Also add a storage field CL3 called "SAVESEC" to save the standard entry class. At tag ST004 after it is verified it is a '5' record, save the entry class by moving MCRSEC to SAVESEC.

It will be necessary to shift the amount to the right to allow for the extra check number positions. Shift it to the right 8 positions.

Also, the 15 digit TRACE for ARC, RCK, XCK, and POP transactions should use the 15 digit TRACE from the '6' record, not calculated.

NAR560—EDIT

This program is modified to check if this is a debit ARC, RCK, or POP transaction. If so, it preferably calls NAR562 to verify against the Check Conversion Parameters if the originator is set up for Check Conversion (FI00-CCTIND='Y').

NAR562—MICR Split Edit

The new Check Conversion logic preferably is only applied when the originator's FILE ID ACF setup has the check Conversion indicator set to "Y".

This program is modified to look at the Check Conversion parameters in the NA4VCMPR view that is retrieved by this program. Check to see if the account number must be changed due to the MIN/MAX account number length parameters and the TRIM LEAD 0 indicator. If it must be changed, then a NOC is created.

In 98GS, if this is a Check Conversion NOC from an original request (not a return), set AG51-DDESC to " " rather than "WFBD".

Reject ARC, RCK, XCK, and POP transactions that have a check serial number with more than 5 digits. Need reject reason code.

NAD100—Thomson File Update

This program is modified to set the default values for the Check Conversion parameters in the Bank File Directory when new bank records are inserted during the Thomson File Update. The insert at P92GI needs to include the new fields for Check Conversion parameters.

At P60BD, it adds a non-ACH bank. Set up the default check Conversion parameters.
CCTIND='M',
QCTIAL=1,
QCTMNL=0,
QCTMXLL-0,
FCTTLZ='N',
CCTPFM=00,
CCTILA='R'

Also update the INSERT at 92GI to include the Check Conversion fields.

NAD101—Fed File Update

This program is modified to set the default values for the Check Conversion parameters in the Bank File Directory when new bank records are inserted during the Fed File Update. The insert at P92GI needs to include the new fields for Check Conversion parameters.

At P62CR, set up the default values based on FMSPL which indicates whether this is an ACH bank. If the value of CR00-FMSPL is "Y", set up the following:
CCTIND='Y',
QCTIAL=14,
QCTMNL=1,
QCTMXLL=13,
FCTTLZ='N',
CCTPFM=00,
CCTILA='D'

Otherwise, set them up to not allow check Conversion:
FCTIND='M',
QCTIAL=1,
QCTMNL=0,
QCTMXLL=0,
FCTTLZ='N',
CCTPFM=00,
CCTILA='R'

If a R/T is being changed to non-ACH MEMBER at 58KD, set the CCTIND to 'M' to not allow check Conversion but to convert it to MICR.

If the R/T is set to ACH MEMBER at 60AP, set up the default Check Conversion parameters to allow check Conversion.

NAG150—NOC Report

This program is modified to identify NOCS as a result of Check Conversion. A new code C99 is used when it was forced to MICR because the member bank does not process ACH Check Conversion transaction.

If this NOC was a result of the Check Conversion parameters, the correct reason code needs to be printed on the report.

At P32BB, add the following reason codes:

C99—Forced to MICR because member bank does not process ACH Check Conversion transactions. Look for AG51-DDESC="WFBDM".

Also besides looking for DDESC="NORWST", look for "WFBD" which is used for Check Conversion NOCs.

Admin Returns process is to put "ADMIN" in this description field for NOCs created as a result of the Admin Returns process correcting the bank/account.

NA1405—Prophet ACF/OCF Read

This program is modified to set up a base charge for companies in which the FCHKTR indicator is set to "Y" at the FILE ID level in NATVFILS.

This program is modified to set up a base charge for companies in which the FADMRT indicator is set to "Y" at the COMPANY ID level in NATVCPNY.

Look at FDELET indicator.

NAH720—Monthly Return Reason Analysis Report

This program is modified for changes to the Monthly Return Reason Analysis Report for the ADMIN NOCS, new C99 NOC code, and the Check Conversion Decision Rejects.

NAC110—ACF Delete

This program is modified for the ACF Delete to add FCTIND and FADMRT to the logs.

NAC120—ACF Copy Test to Production

This program is modified for the ACF Copy Test to Production to include FADMRT and FCTIND.

NAC210—ACF Setup Report.

This program is modified to add FADMRT and FCTIND to the ACF Setup Report.

NAH400—Returns Statistics

This program is modified to identify DDESC='WFBD' as an ON US NOC. Where NORWST is being looked at in P30BJ, also look for WFBD.

NAH700—Returns Extract.

This program is modified to also look for WFBD where it looks for NORWST.

Batch Program Recompiles
  NAC121
  NAR540
  NAR550
  NAR590
  NAR591
  NAR592
  NAR599
  NAR600

Report Programs

New Report Programs

RT1—Check Conversion Problem Report by R/T
  This Pacbase report program is used by the new program NAD300 to produce the Check Conversion Problem Report by R/T.

RT2—Check Conversion Problem Report by File ID/Company ID
  This Pacbase report program is used by the new program NAD310 to produce the Check Conversion Problem Report by File ID/Company ID.

RT3—Check Conversion Detail Report by R/T
  This Pacbase report program is used by the new program NAD320 to produce the Check Conversion Problem Detail Report by R/T.

RT4—Check Conversion Detail Report by File ID/Company ID
  This Pacbase report program is used by the new program NAD330 to produce the Check Conversion Problem Detail Report by File ID/Company ID.

RHN—Monthly Return Analysis
  This program provides customers with their overall origination and return summary information, including return rates, redeposit rates, administrative return rates, and the like.

Report Program Changes

RHQ—Return Reason Analysis Summary
  This report is modified to add the number of admin returns, admin NOCs, and deposit adjustment returns.

RHN—Return Reason Analysis Reports
  This report is for the Return Reason Analysis Report and is modified for the new lines to print.

RC6—ACF Setup Report
  This report is modified to print the new CHECK CONVERSION and ADMIN RETURNS indicators which are now part of the ACF setup.

RDF—Fed File Update Report
  This report is modified to print the BEFORE/AFTER values of any Check Truncation—fields that change as a result of the update.
  Also display the Check Truncation data for each RT updated on this report.

Online Programs

New Online Programs
  None.

Online Program Changes
  NAD006
  This program is modified to add new Check Conversion Database fields to the detail screen for the Bank Directory File.
  NAC062
  This program is modified to add new Check Conversion indicator at the File ID level of the ACF screen NA62. This indicator should be set to "Y" or "N".
  Also, do not allow CHK TRUNC to be set to "Y" if MICR SPLIT or CU CONVERSION is set to "N".
  NAC063
  This program is changed to initialize the FADMRT option for RETURNS when an add is being done. Add this to P29MA by setting CPNY-FADMRT to "N".
  NAC066
  This program is modified to add new Admin Returns indicator at the Company ID level of the ACF screen NA66. This indicator should be set to "Y" or "N".

Exemplary Report Layouts

New Report Layouts
  The following tables show examples of new report layouts according to a preferred embodiment of the invention.

TABLE A

D300-1 Check Conversion Problem RT Report by RT

| REPORT ID: D300-1 FN | AUTOMATED CLEARING HOUSE | SYS DATE: MM/DD/YY |
|---|---|---|
| LOCATION: 0000 | CHECK CONVERSION PROBLEM | SYS TIME: HH:MM |
| DATES: MM/DD/YY–MM/DD/YY | R/T REPORT | PAGE: XXXX |

| BANK R/T | ADMIN RETURNS | OTHER RETURNS | PERCENT | NOC |
|---|---|---|---|---|
| XXXXXXXXX | XXX,XXX,XXX | XXX,XXX,XXX | XX% | XXX,XXX,XXX |
| XXXXXXXXX | XXX,XXX,XXX | XXX,XXX,XXX | XX% | XXX,XXX,XXX |
| XXXXXXXXX | XXX,XXX,XXX | XXX,XXX,XXX | XX% | XXX,XXX,XXX |
| XXXXXXXXX | XXX,XXX,XXX | XXX,XXX,XXX | XX% | XXX,XXX,XXX |
| XXXXXXXXX | XXX,XXX,XXX | XXX,XXX,XXX | XX% | XXX,XXX,XXX |
| XXXXXXXXX | XXX,XXX,XXX | XXX,XXX,XXX | XX% | XXX,XXX,XXX |
| XXXXXXXXX | XXX,XXX,XXX | XXX,XXX,XXX | XX% | XXX,XXX,XXX |
| XXXXXXXXX | XXX,XXX,XXX | XXX,XXX,XXX | XX% | XXX,XXX,XXX |
| TOTAL | XXX,XXX,XXX | XXX,XXX,XXX | XX% | XXX,XXX,XXX |

Admin returns = R03, R04, R12, R13, R20
Percent = Admin Returns/(Admin Returns + Other Returns)
TO WSF2
ADHOC INQUIRIES FROM HISTORY SERVER

TABLE B

D310-1 Check Conversion Problem RT Report by File Id/Company ID

REPORT ID: D310-1 FN  AUTOMATED CLEARING HOUSE  SYS DATE: MM/DD/YY
LOCATION: 0000  CHECK CONVERSION PROBLEM  SYS TIME: HH:MM
DATES: MM/DD/YY–MM/DD/YY  FILE/COMPANY ID REPORT  PAGE: XXXX

| FILE ID | COMPANY ID | ADMIN RETURNS | OTHER RETURNS | PERCENT | NOC |
|---|---|---|---|---|---|
| XXXXXXXXXX | XXXXXXXXXX | XXX,XXX,XXX | XXX,XXX,XXX | XX | XXX,XXX,XXX |
| XXXXXXXXXX | XXXXXXXXXX | XXX,XXX,XXX | XXX,XXX,XXX | XX | XXX,XXX,XXX |
| XXXXXXXXXX | XXXXXXXXXX | XXX,XXX,XXX | XXX,XXX,XXX | XX | XXX,XXX,XXX |
| FILE TOTAL | | XXX,XXX,XXX | XXX,XXX,XXX | XX | XXX,XXX,XXX |
| XXXXXXXXXX | XXXXXXXXXX | XXX,XXX,XXX | XXX,XXX,XXX | XX | XXX,XXX,XXX |
| XXXXXXXXXX | XXXXXXXXXX | XXX,XXX,XXX | XXX,XXX,XXX | XX | XXX,XXX,XXX |
| FILE TOTAL | | XXX,XXX,XXX | XXX,XXX,XXX | XX | XXX,XXX,XXX |
| TOTAL OF ALL FILES | | XXX,XXX,XXX | XXX,XXX,XXX | XX | XXX,XXX,XXX |

Select FILE ID'S with FCTIND = Y

TABLE C

D320-1 Check Conversion Detail Report

REPORT ID: D320-1 FN  AUTOMATED CLEARING HOUSE  SYS DATE: MM/DD/YY
LOCATION: 0000  CHECK CONVERSION DETAIL  SYS TIME: HH:MM
DATE: MM/DD/YY  R/T REPORT  PAGE: XXXX

| BANK R/T | ACCOUNT # | SERIAL# | TC | CODE | TYPE | NOC INFORMATION |
|---|---|---|---|---|---|---|
| XXXXXXXX | XXXXXXXXXXXXXXXX | XXXXXX | XX | R03 | ADMIN | |
| XXXXXXXX | XXXXXXXXXXXXXXXX | XXXXXX | XX | R03 | ADMIN | |
| XXXXXXXX | XXXXXXXXXXXXXXXX | XXXXXX | XX | R04 | ADMIN | |
| XXXXXXXX | XXXXXXXXXXXXXXXX | XXXXXX | XX | R12 | ADMIN | |
| XXXXXXXX | XXXXXXXXXXXXXXXX | XXXXXX | XX | R12 | ADMIN | |
| XXXXXXXX | XXXXXXXXXXXXXXXX | XXXXXX | XX | R20 | ADMIN | |
| XXXXXXXX | XXXXXXXXXXXXXXXX | XXXXXX | XX | R20 | ADMIN | |
| TOTAL ADMIN RETURNS XXX,XXX,XXX | | | | | | |
| XXXXXXXX | XXXXXXXXXXXXXXXX | XXXXXX | XX | R01 | NON-ADMIN | |
| XXXXXXXX | XXXXXXXXXXXXXXXX | XXXXXX | XX | R08 | NON-ADMIN | |
| XXXXXXXX | XXXXXXXXXXXXXXXX | XXXXXX | XX | R08 | NON-ADMIN | |
| XXXXXXXX | XXXXXXXXXXXXXXXX | XXXXXX | XX | R09 | NON-ADMIN | |
| XXXXXXXX | XXXXXXXXXXXXXXXX | XXXXXX | XX | R10 | NON-ADMIN | |
| TOTAL NON-ADMIN RETURNS XXX,XXX,XXX | | | | | | |
| XXXXXXXX | XXXXXXXXXXXXXXXX | XXXXXX | XX | C01 | NOC | XXXXXXXXXXXXXXXXX |
| XXXXXXXX | XXXXXXXXXXXXXXXX | XXXXXX | XX | C01 | NOC | XXXXXXXXXXXXXXXXX |
| XXXXXXXX | XXXXXXXXXXXXXXXX | XXXXXX | XX | C02 | NOC | XXXXXXXX |
| XXXXXXXX | XXXXXXXXXXXXXXXX | XXXXXX | XX | C04 | NOC | XXXXXXXXXXXXXXXXXXXXXX |
| XXXXXXXX | XXXXXXXXXXXXXXXX | XXXXXX | XX | C04 | NOC | XXXXXXXXXXXXXXXXXXXXX |
| XXXXXXXX | XXXXXXXXXXXXXXXX | XXXXXX | XX | C05 | NOC | XX |
| XXXXXXXX | XXXXXXXXXXXXXXXX | XXXXXX | XX | C06 | NOC | XXXXXXXXXXXXXXXXX XX |
| XXXXXXXX | XXXXXXXXXXXXXXXX | XXXXXX | XX | C07 | NOC | XXXXXXXX XXXXXXXXXXXXXXXXX XX |
| XXXXXXXX | XXXXXXXXXXXXXXXX | XXXXXX | XX | C09 | NOC | XXXXXXXXXXXXXXXXXXXX |
| TOTAL NOC XXX,XXX,XXX | | | | | | |
| XXXXXXXX | XXXXXXXXXXXXXXXX | XXXXXX | XX | R13 | ADMIN | |
| XXXXXXXX | XXXXXXXXXXXXXXXX | XXXXXX | XX | R13 | ADMIN | |
| TOTAL ADMIN RETURNS XXX,XXX,XXX | | | | | | |
| TOTAL NON-ADMIN RETURNS XXX,XXX,XXX | | | | | | |
| TOTAL NOC XXX,XXX,XXX | | | | | | |

TABLE D

D330-1 Check Conversion Detail File/Company ID Report

REPORT ID: D330-1 FN  AUTOMATED CLEARING HOUSE  SYS DATE: MM/DD/YY
LOCATION: 0000  CHECK CONVERSION DETAIL  SYS TIME: HH:MM
DATE: MM/DD/YY  FILE/COMPANY ID REPORT  PAGE: XXXX

FILE ID XXXXXXXXXX
COMPANY ID XXXXXXXXXX

TABLE D-continued

D330-1 Check Conversion Detail File/Company ID Report

| BANK R/T | ACCOUNT # | SERIAL# | TC | CODE | TYPE | NOC INFORMATION |
|---|---|---|---|---|---|---|
| XXXXXXXX | XXXXXXXXXXXXXXXX | XXXXXX | XX | R03 | ADMIN | |
| XXXXXXXX | XXXXXXXXXXXXXXXX | XXXXXX | XX | R04 | ADMIN | |
| XXXXXXXX | XXXXXXXXXXXXXXXX | XXXXXX | XX | R13 | ADMIN | |
| XXXXXXXX | XXXXXXXXXXXXXXXX | XXXXXX | XX | R04 | ADMIN | |
| XXXXXXXX | XXXXXXXXXXXXXXXX | XXXXXX | XX | R12 | ADMIN | |
| XXXXXXXX | XXXXXXXXXXXXXXXX | XXXXXX | XX | R20 | ADMIN | |
| XXXXXXXX | XXXXXXXXXXXXXXXX | XXXXXX | XX | R13 | ADMIN | |
| XXXXXXXX | XXXXXXXXXXXXXXXX | XXXXXX | XX | R13 | ADMIN | |
| XXXXXXXX | XXXXXXXXXXXXXXXX | XXXXXX | XX | R12 | ADMIN | |
| TOTAL ADMIN RETURNS XXX,XXX,XXX | | | | | | |
| XXXXXXXX | XXXXXXXXXXXXXXXX | XXXXXX | XX | R01 | NON-ADMIN | |
| XXXXXXXX | XXXXXXXXXXXXXXXX | XXXXXX | XX | R09 | NON-ADMIN | |
| XXXXXXXX | XXXXXXXXXXXXXXXX | XXXXXX | XX | R07 | NON-ADMIN | |
| XXXXXXXX | XXXXXXXXXXXXXXXX | XXXXXX | XX | R08 | NON-ADMIN | |
| XXXXXXXX | XXXXXXXXXXXXXXXX | XXXXXX | XX | R10 | NON-ADMIN | |
| XXXXXXXX | XXXXXXXXXXXXXXXX | XXXXXX | XX | R01 | NON-ADMIN | |
| XXXXXXXX | XXXXXXXXXXXXXXXX | XXXXXX | XX | R10 | NON-ADMIN | |
| TOTAL NON-ADMIN RETURNS XXX,XXX,XXX | | | | | | |
| XXXXXXXX | XXXXXXXXXXXXXXXX | XXXXXX | XX | C01 | NOC | XXXXXXXXXXXXXXXXX |
| XXXXXXXX | XXXXXXXXXXXXXXXX | XXXXXX | XX | C01 | NOC | XXXXXXXXXXXXXXXXX |
| XXXXXXXX | XXXXXXXXXXXXXXXX | XXXXXX | XX | C02 | NOC | XXXXXXXXX |
| XXXXXXXX | XXXXXXXXXXXXXXXX | XXXXXX | XX | C04 | NOC | XXXXXXXXXXXXXXXXXXXXX |
| XXXXXXXX | XXXXXXXXXXXXXXXX | XXXXXX | XX | C04 | NOC | XXXXXXXXXXXXXXXXXXXXX |
| XXXXXXXX | XXXXXXXXXXXXXXXX | XXXXXX | XX | C05 | NOC | XX |
| XXXXXXXX | XXXXXXXXXXXXXXXX | XXXXXX | XX | C06 | NOC | XXXXXXXXXXXXXXXX XX |
| XXXXXXXX | XXXXXXXXXXXXXXXX | XXXXXX | XX | C07 | NOC | XXXXXXXXX XXXXXXXXXXXXXXXX XX |
| XXXXXXXX | XXXXXXXXXXXXXXXX | XXXXXX | XX | C09 | NOC | XXXXXXXXXXXXXXXXXXXXXX |
| TOTAL NOC XXX,XXX,XXX | | | | | | |

TABLE E

S400-1 Monthly Availability Report

Align date/time to the right
REPORT ID: D130-1 FN    AUTOMATED CLEARING HOUSE SYS DATE: MM/DD/YY
LOCATION: 0001          CHECK CONVERSION MONTHLY AVAILABILITY REPORT SYS TIME: HH:MM
COMPANY: XXXXXXXXXX     DATES: XX/XX/XX–XX/XX/XX PAGE: XXXX

| PROCESSING DATE | PROCESSING TIME | TOTAL ITEMS | TOTAL DOLLARS | RDFI | ITEM COUNT |
|---|---|---|---|---|---|
| MM/DD/YY | HH:MM XX | XXX,XXX,XXX | XXXXXXXXXX | XXX,XXX,XXX | X |
| COMPANY TOTAL | | XXX,XXX,XXX | | XXX,XXX,XXX | |

| | PROCESSING DATE | PROCESSING TIME | DOLLARS | AVAILABILITY |
|---|---|---|---|---|
| | MM/DD/YY | HH:MM XX | XXX,XXX,XXX,XXX.XX | XXX,XXX,XXX,XXX.XX |
| | COMPANY TOTAL | | XXX,XXX,XXX,XXX.XX | XXX,XXX,XXX,XXX.XX |

Report Layout Changes

TABLE F

Monthly Return Analysis Report

| ORIG BANK | |
|---|---|
| | 091000019 |
| | WELLS FARGO MINNESOTA, NATIONA |
| | 6TH ST & MARQUETTE AVE |
| | MINNEAPOLIS MN 55479 |
| | JANE SMITH |
| | ABC COMPANY |
| | 123 A STREET |
| | SMALLVILLE CA 95123 |
| FILE ID: | A123456789 |
| REPORT H123-N FN | AUTOMATED CLEARING HOUSE                SYS DATE: 01/02/02 |

TABLE F-continued

Monthly Return Analysis Report

| | | | |
|---|---|---|---|
| PAGE 1 | MONTHLY RETURN REASON ANALYSIS REPORT | | SYS TIME: 04:56 |
| | ACH ANALYSIS FOR 12/01 | | |
| | ORIG BANK R/T: 456000123 | | |
| | ORIG BANK. NAME: WELLS FARGO, NATIONAL ASSOCIATION | | |
| | COMPANY ID: A12345678 | | |
| | COMPANY NAME: XXXX | | |
| | FILE ID: A429483498 | | |
| | FILE NAME: ABC COMPANY | | |
| | PRODUCT: OTHER CONSUMER COLL | | |
| FAX1: 1-(123) 123-4567 | ATTN: JANE SMITH | | |
| FAX2: 1-(456) 321-7654 | ATTN: CAROL JACOB | | |

| | ACH | | | | | |
|---|---|---|---|---|---|---|
| ACTIVITY | ITEMS/PCNT | | DOLLARS/PCNT | | 0–5 | 6–10 | >10 |
| ORIGINATED | 7,178 | 100.0% | XX,YYY.DD | 100.0% | DAYS | DAYS | DAYS |
| RETURNED | | | | | | | |
| R01: INSUF FUND | 12 | 9.5% | XXX.XX | 8.9% | 12 | 0 | 0 |
| R02: ACCT CLSED | 8 | 6.3% | XXX.XX | 6.3% | 8 | 0 | 0 |
| R03: NO ACCOUNT | 77 | 61.1% | XXX.XX | 62.0% | 77 | 0 | 0 |
| R04: INV ACCT | 27 | 21.4% | XXX.XX | 21.5% | 27 | 0 | 0 |
| R07: REVOKED | 1 | 0.7% | XX.XX | 0.7% | 1 | 0 | 0 |
| R13: RFI INVAL | 1 | 0.7% | X.XX | 0.4% | 1 | 0 | 0 |
| TOTAL | 126 | 100.0% | Y,YYY.YY | 100.0% | 126 | 0 | 0 |
| REDEPOSITED 1ST REPRESENTMENT | | | | | | | |
| R01: INSUF FUND | 9 | 100.0% | XXX.XX | 100.0% | | | |
| REDEPOSITED 2ND REPRESENTMENT | | | | | | | |
| R01: INSUF FUND | 1 | 100.0% | XX.XX | 100.0% | | | |
| TOTAL | 10 | 100.0% | XXX.XX | 100.0% | | | |
| RETIRED REDEPOSIT | | | | | | | |
| R01: INSUF FUND | 4 | 66.6% | XX.XX | 60.6% | | | |
| R02: ACCT CLSED | 2 | 33.3% | XX.XX | 39.3% | | | |
| TOTAL | 6 | 100.0% | XX.XX | 100.0% | | | |
| NOTIFICATION OF CHANGE | | | | | | | |
| C01: ACCOUNT NO | 10 | 58.8% | XXX.XX | 60.4% | 10 | 0 | 0 |
| C02: R/T NUMBER | 4 | 23.5% | XX.XX | 20.6% | 3 | 1 | 0 |
| C03: R/T & ACCT | 3 | 17.6% | XX.XX | 18.9% | 2 | 1 | 0 |
| C99: CHKT MICR | 0 | 0.0% | 0.00 | 0.0% | 0 | 0 | 0 |
| ADM: ADMIN NOCS | 0 | 0.0% | 0.00 | 0.0% | 0 | 0 | 0 |
| TOTAL | 17 | 100.0% | 197.75 | 100.0% | 15 | 2 | 0 |
| CHECK CONVERSION ADMIN RETURNS | XX | XXX.X% | | | | | |
| CHECK CONVERSION | DECISION | REJECTS | | | | | |
| ???: REJECTED | 4 | 100.0% | XX.XX | 100.0% | | | |
| TOTAL | 4 | 100.0% | XX.XX | 100.0% | | | |

| | | | |
|---|---|---|---|
| REPORT H220-Q | FN AUTOMATED CLEARING HOUSE | | SYS DATE: 01/02/02 |
| PAGE 2 | RETURN REASON ANALYSIS - SUMMARY REPORT | | SYS TIME: 04:56 |
| | ANALYSIS FOR 12/01 | | |
| | ORIG BANK R/T: 123456789 | | |
| | ORIG BANK NAME: WELLS FARGO, NATIONAL ASSOCIATION | | |
| | COMPANY ID: A123456789 | | |
| | COMPANY NAME: ABC COMPANY | | |
| | FILE ID: A123456789 | | |
| | FILE NAME: ABC COMPANY | | |
| | PRODUCT: OTHER CONSUMER COLL | | |
| | 1ST REDEPOSIT WINDOW: 4 | | |
| | 2ND REDEPOSIT WINDOW: 3 | | |
| FAX1: 1-(123) 123-4567 | ATTN: JANE SMITH | | |
| FAX2: 1-(321) 321-7654 | ATTN: CAROL JACOB | | |

TABLE F-continued

Monthly Return Analysis Report

|  | COMPANY RESULTS | INDUSTRY COMPARISON |
|---|---|---|
| NO. OF DOLLAR ENTRIES ORIGINATED: | X,XXX | |
| % OF ACH ENTRIES: | 100.00% | 99.4% |
| % OF PAC ENTRIES | 0.00% | 0.6% |
| % OF ENTRIES RETURNED: | X.XX% | 1.8% |
| NO. OF ACH DOLLAR RETURNS: | XXX | |
| % OF RETURNS DISHONORED: | 0.00% | 0.3% |
| NO. OF ACH PRENOTE RETURNS: | 0 | |
| % OF PRENOTE RETURNS: | 0.00% | 1.7% |
| NO. OF ACH RETURNS 1ST REDEPOSIT: | X | |
| % OF ACH REDPOSITS COLLECTED: | 25.00% | 52.7% |
| NO. OF ACH RETURNS 2ND REDEPOSIT: | 1 | |
| % OF ACH REDPOSITS COLLECTED: | 25.00% | 52.7% |
| NO. OF NOCS RECEIVED: | 17 | |
| % OF NOCS REFUSED: | 0.00% | 0.8% |
| CHECK CONVERSION ADMIN RETURNS | | |
| NO. OF CHECK TRUNC DECISION REJECTS | 4 | |
| OF REJECTS | 100.00% | |

TABLE G

D101F - Fed File Update

FEDERAL TAPE: XYZ BANK DIRECTORY MONTHLY UPDATE
ACTION.....: xxxxxx                                    LAST CHNG.: 06/30/88   UPDATE SRC: F
ROUTE/TRAN.: xxxxxxxxx                                 BANK NAME.: XYZ BANK - MIDDLE TOWN
                                                       ACH MEMBER: Y          BANK STAT.: A
                                                       ACH MBR DT: 07/01/91   STAT DATE.: 07/01/91
                                                       SURV R/T..:            INST TYPE.: 01
RT/FRAC...: xxxxxxxxxxx                                FED R/T...: 091000080
BANK ADDR..: xxxxxxxxxxxxxxxxxxxxxxxxxxxxx
CITY.......: xxxxxxxxxxxxxxxxxxxxxxxxxxxxx
STATE......: xx                                        ZIP CODE..: xxxxx xxxx
PHONE NBR..: (xxx) xxx-xxxx
THOM RETIRE: xx/xx/xx                                  FED RETR..: xx/xx/xx
CHECK TRUNC: X                                         INV LENGTH: XX         INV LENGTH ACTION: X
MIN LENGTH.: XX                                        MAX LENGTH: XX         PARSE FORMAT ....: XX
TRIM LEAD 0: X

40

Exemplary Online Screens
The following tables show sample online screens according to one embodiment of the invention.

TABLE H

NA06 - Bank Directory Detail

NA06                        WELLS FARGO BANK DIRECTORY DETAIL    02/21/02 11:06
                                                                 LAST CHNG.: 02/16/99
ACTION....: (A—ADD, C—CHANGE)                                    CHANGED BY: MAINELSO
                                                                 UPDATE SRC:
ROUTE/TRAN: 091000XXX      SURVIVE RT: 0                         BANK STAT.: A
RTE SYMBOL: 0XX            ACH MEMBER: Y                         STAT DATE.: 04/18/92
R/T FRAC..: 01XXXXXXXXX    ACH MBR DT: 05/12/89                  ASSOC NAME:
BANK ABA..: XXXXXX         ACH CONTCT:
CU ID POS.:                CU ID.....:                           CU PROCESR: 000000000
CU R/T FLG:                CU ACT FLG:                           CU PROCESS:
CHK TRUNC: X LEGNTH INV: XX ACT: X MIN: XX MAX: XX FORMAT: XX TRIM LEAD 0: X
BANK NAME.: XYZ BANK MINNESOTA, NATIONAL ASSOCIATION
STREET ADR: ZZZZZZZZZZZZZZZZZZZ
CITY......: XXXXXXX
STATE.....: XX             ZIP CODE..: 12345                     PHONE NBR.: (321) 123-4567
MBR OVRD..:    OVRD DATE.: THOMP RETR: / 0/                      FED RETIRE: / 0/
REASON:
INDMNTY RQ:    PRENOTE RQ:
SPEC INSTR:
NEXT TRAN:     INPUT:                                            5003 PF:

TABLE I

NA62 - ACF File ID Level

| | | |
|---|---|---|
| NA62 | ACF FILE SETUP | 02/20/02 10:23 |
| | | LAST CHNG.: 01/24/02 |
| ACTION....: (A = ADD, C = CHG, D = DEL) | DELETE FLG: | CHANGED BY: |
| REGION CDE: 0X | MULT CPNY.: | MULT BTCH.: |
| LOCATION..: 0000 | CUST SPPRT: 0000 | SHORT NAME: |
| FILE ID...: | FILE OWNER: | |
| ADDR 1ST..: | | CIS UPDATE: N CISABA: |
| ADDR 2ND..: | | CIS DDA...: |
| CITY......: | | STATE: ZIP: |
| DELIV METH: 0 | NWCNOT....: ORIG TRACE: | MVS APPLID: |
| ORIG TYPE.: | TXMT TYPE.: MOD OVERLY: | USER ID...: XXXXXXXX |
| MICR SPLIT: | CU CNVRSN.: R/T ACCT..: | R/T ACCT #: 0 |
| MICR SPPRT: | MICR SETL.: FILE SETL.: | BATCH REPT: N CHK TRUNC: X |
| CPNY REP..: | WORK: ( ) - | HOME: (999) 999-9999 |
| RISK REP..: | WORK: ( ) - | HOME: (999) 999-9999 |
| AFTER HRS1: UNKNOWN | WORK: (999) 999-9999 | HOME: |
| AFTER HRS2: | WORK: | HOME: |
| CSMGT REP.: | WORK: | HOME: |
| ACCT OFFCR | WORK: ( ) - | RISK: SCHD: |
| PF5 CPNY\BATCH, PF7 PREV FILE, PF8 NEXT FILE, PF11 RISK\COMM, PF12 SCHEDULE | | |
| NEXT SCREEN: 4723 PF: | | |

TABLE J

NA66 - ACF Company ID Level

| | | |
|---|---|---|
| NA66 | ACF RECEIVED RETURNS | 03/07/02 16:45 |
| | | LAST CHNG.: |
| ACTION....: | (C = CHG) DELETE FLG: | CHANGED BY: |
| REGION CDE: | LOCATION..: RPTG ABA..: | SHORT NAME: |
| FILE ID...: | FILE OWNER: | |
| COMPANY ID | COMPANY...: | |
| RTN ATTN..: | RTN CO: | |
| RTN ADD1..: | | |
| RTN ADD2..: | | |
| RTN CITY..: | RTN STATE.: | ZIP CODE..: |
| FLOAT BYP.: | ADM RETURN: X | |
| BYPASS R/T: | BYPASS ACT.: | ACCT TYPE.: |
| RTN R\T....: | RTN ACCT..: | ACCT TYPE.: |
| RDPST CDE.: | RDPST LOW.: | RDPST HIGH: |
| RDPST NBR.: | RDPST HIST: | RDPST WIND: |
| DISH CODE.: | DISH LOW..: | DISH HIGH.: |
| UNTIMELY..: | REPAIR FLG: | TAPE RET..: |
| RTN MEDIA.: | RTN ANALY.: RTN SRT OPT.: | COMP EXIT.: |
| GEN INSTR.: | | |
| INVALID VALUE FOR THE FIELD LAST CHANGE DATE | | |
| NEXT SCREEN: PF: | | |

Accordingly, although the invention has been described in detail with reference to particular preferred embodiments, persons possessing ordinary skill in the art to which this invention pertains will appreciate that various modifications and enhancements may be made without departing from the spirit and scope of the claims that follow.

The invention claimed is:

1. A method for processing checks, the method comprising:
   scanning a check drawn against an account associated with a consumer to capture information needed to create an ACH debit;
   automatically determining, at a computing apparatus, based at least in part on the captured information, whether the check is eligible to be converted into an ACH debit by:
      determining whether the check is a consumer check;
      determining whether the consumer has been notified that the check will be converted into an ACH debit;
      determining whether the check is associated with a financial institution that does not accept ACH transactions;
      determining whether the consumer has refused to allow conversion of the check into an ACH debit; and
      evaluating a length and a position of a Magnetic Ink Character Recognition (MICR) line of the check to determine whether the check can be converted into an ACH debit;
   depositing the check at a financial institution when a determination is made that the check is not a consumer check;
   depositing the check at the financial institution when a determination is made that the consumer has not been notified;
   depositing the check at the financial institution when a determination is made that the financial institution does not accept ACH transactions;
   depositing the check at the financial institution when a determination is made that the consumer does not allow conversion of the check into an ACH debit;
   depositing the check at the financial institution when a determination is made that the evaluation of the MICR line indicates that the check cannot be converted into an ACH debit; and
   automatically creating, at the computing apparatus, an electronic file that contains the information needed to create an ACH debit when a determination is made that the check is eligible to be converted into an ACH debit because the check is a consumer check, the consumer has been notified, the financial institution accepts ACH transactions, the consumer allows conversion of the check into an ACH debit, and evaluation of the MICR line indicates that the check can be converted into an ACH debit.

2. The method of claim 1, further comprising:
   receiving, at a lockbox, an envelope that contains the check; and
   prior to scanning the check, removing the check from the envelope.

3. The method of claim 2,
   wherein the envelope includes a payment coupon that specifies a billing account number associated with the customer;

wherein the method further comprises capturing the billing account number from the payment coupon; and wherein automatically determining whether the check is eligible to be converted into an ACH debit comprises determining, based at least in part on the billing account number and the captured information, whether the check is eligible to be converted into an ACH debit.

4. The method of claim 2, wherein removing the check from the envelope comprises removing the check from the envelope at a site operated by a party other than the customer and other than a party to whom the customer wrote the check.

5. The method of claim 1, wherein automatically determining whether the check is eligible to be converted into an ACH debit comprises determining that the check is not eligible to be converted into an ACH debit when a size of the check is not consistent with a size of a consumer check.

6. The method of claim 1, wherein automatically determining whether the check is eligible to be converted into an ACH debit comprises determining that the check is not eligible to be converted into an ACH debit when a Magnetic Ink Character Recognition (MICR) line of the check has a length that is not consistent with a length of a MICR line of a check that is eligible to be converted into an ACH debit.

7. The method of claim 1, wherein scanning the check to capture information needed to create an ACH debit comprises scanning the check to capture a routing/transfer (R/T) number printed on the check, an account number printed on the check, and a serial number of the check.

8. The method of claim 1, wherein creating the electronic file comprising creating the electronic file such that the electronic file is a National Automated Clearing House Association (NACHA) formatted file.

9. The method of claim 1,
wherein the financial institution is a first financial institution; and
wherein the method further comprises sending the electronic file to a second financial institution that uses the electronic file to originate an ACH debit.

10. The method of claim 9, wherein the first financial institution and the second financial institution are the same financial institution.

11. The method of claim 1, wherein automatically determining whether the check is eligible to be converted into an ACH debit comprises:
determining that the check is not eligible to be convened into an ACH debit when a R/T number of the check is not active;
determining that the check is not eligible to be converted into an ACH debit when the R/T number of the check is associated with a financial institution that does not participate in ACH transactions; and
determining that the check is not eligible to be converted into an ACH debit when a length of an account number of the check is not valid.

12. The method of claim 1, wherein automatically determining whether the check is eligible to be convened into an ACH debit comprises:
determining whether an account number of the check includes a R/T number of a credit union and a credit union account number;
converting the account number of the check into the R/T number of the credit union and the credit union account number when it is determined that the account number of the check includes the R/T number of the credit union and the credit union account number; and
using the R/T number of the credit union to automatically determine whether the check is eligible to be converted into an ACH debit.

13. The method of claim 1,
wherein the method further comprises storing a table that associates R/T numbers with MICR line parsing formats; and
wherein automatically determining whether the check is eligible to be converted into an ACH debit comprises:
using the table to identify a MICR line parsing format associated with the R/T number of the check;
identifying a check serial number of the check and an account number of the check by parsing the MICR line of the check using the identified MICR line parsing format; and
using the check serial number and the account number to determine whether the check is eligible to be converted into an ACH debit.

14. The method of claim 1,
wherein automatically determining whether the check is eligible to be converted into an ACH debit comprises executing software that automatically determines whether the check is eligible to be converted into an ACH debit; and
wherein the method further comprises receiving an upgrade to the software, the upgrade enabling the software to more accurately determine whether checks are eligible to be converted into ACH debits.

15. The method of claim 14, further comprising:
receiving an ACH administrative return associated with the check; and
identifying a change to the software that, if such change had been applied to the software when the software determined that the check was eligible to be converted into a ACH debit, would have determined that the check was not eligible to be converted into an ACH debit,
wherein the upgrade incorporates the change to the software.

16. The method of claim 14, further comprising:
receiving a Notification of Change (NOC) associated with the check; and
identifying a change to the software that, if such change had been applied to the software when the software determined that the check was eligible to be converted into a ACH debit, would have determined that the check was not eligible to be converted into an ACH debit,
wherein the upgrade incorporates the change to the software.

17. The method of claim 1, further comprising destroying the check after a predetermined amount of time has passed after the check was converted into an ACH debit.

18. The method of claim 1, further comprising, prior to depositing the check at the financial institution when it is determined that the check is not eligible to be converted into an ACH debit, power encoding the check.

19. The method of claim 1, further comprising:
receiving an administrative return associated with the check; and
in response to receiving the administrative return, automatically drafting a replacement document that replaces the check.

20. A method for processing checks, the method comprising:
receiving, at an originating depository financial institution (ODFI), an administrative return associated with a check;

in response to receiving the administrative return, automatically determining whether the check is eligible to be converted into an ACH debit by:
    determining whether the check is a consumer check drawn against an account associated with a consumer;
    determining whether the consumer has been notified that the check will be converted into an ACH debit;
    determining whether the check is associated with a financial institution that does not accept ACH transactions;
    determining whether the consumer has refused to allow conversion of the check into an ACH debit; and
    evaluating a length and a position of a Magnetic Ink Character Recognition (MICR) line of the check to determine whether the check can be converted into an ACH debit;
depositing the check at a financial institution when a determination is made that the check is not a consumer check;
depositing the check at the financial institution when a determination is made that the consumer has not been notified;
depositing the check at the financial institution when a determination is made that the financial institution does not accept ACH transactions;
depositing the check at the financial institution when a determination is made that the consumer does not allow conversion of the check into an ACH debit;
depositing the check at the financial institution when a determination is made that the evaluation of the MICR line indicates that the check cannot be converted into an ACH debit;
automatically converting, at a computing apparatus, the check into an ACH debit when a determination is made that the check is eligible to be converted into an ACH debit because the check is a consumer check, the consumer has been notified that the check will be converted into an ACH debit, the financial institution accepts ACH transactions, the consumer has allowed conversion of the check into an ACH debit, and evaluation of the MICR line indicates that the check can be converted into an ACH debit; and
using the ACH debit to re-present the check.

21. The method of claim 20,
wherein the method further comprises storing a table that associates routing/transfer (R/T) numbers with MICR line parsing formats; and
wherein automatically determining whether the check is eligible to be converted into an ACH debit comprises:
    using the table to identify a MICR line parsing format associated with the R/T number of the check;
    identifying a check serial number of the check and an account number, parsing the MICR line of the check using the identified MICR line parsing format; and
    using the check serial number and the account number to determine whether the check is eligible to be convened into an ACH debit.

22. A method for processing checks, the method comprising:
    receiving a check at a point-of-sale;
    in response to receiving the check, extracting information from the check at the point-of-sale;
    transmitting the information to a computing device at a remote location that determines whether the check is eligible to be convened into an ACH debit by:
        determining whether the check is a consumer check drawn against an account associated with a consumer;
        determining whether the consumer has been notified that the check will be convened into an ACH debit;
        determining whether the check is associated with a financial institution that does not accept ACH transactions;
        determining whether the consumer has refused to allow conversion of the check into an ACH debit; and
        evaluating a length and a position of a Magnetic Ink Character Recognition (MICR) line of the check to determine whether the check can be converted into an ACH debit;
    receiving, from the remote location, a confirmation when it is determined at the remote location that the check is eligible to be convened into an ACH debit because the check is a consumer check, the consumer has been notified, the financial institution accepts ACH transactions, the consumer allows conversion of the check into an ACH debit, and evaluation of the MICR line indicates that the check can be converted into an ACH debit;
    receiving, from the remote location, a rejection when it is determined at the remote location that the check is not a consumer check;
    receiving, from the remote location, the rejection when it is determined at the remote location that the consumer has not been notified;
    receiving, from the remote location, the rejection when it is determined at the remote location that the financial institution does not accept ACH transactions;
    receiving, from the remote location, the rejection when it is determined at the remote location that the consumer does not allow conversion of the check into an ACH debit;
    receiving, from the remote location, the rejection when it is determined at the remote location that evaluation of the MICR line indicates that the check cannot be convened into an ACH debit;
    converting the check into an ACH debit when the confirmation is received; and
    depositing the check when the rejection is received.

23. The method of claim 22, wherein the method further comprises power encoding the check when it is determined at the remote location that the check is not eligible to be convened into an ACH debit.

24. An apparatus for processing checks, the apparatus comprising:
    means for receiving an envelope that contains a check drawn against an account associated with a consumer and a billing coupon that specifies a billing account number assigned to the consumer by a biller;
    means for extracting the check and the billing coupon from the envelope;
    means for scanning the check to capture a Magnetic Ink Character Recognition (MICR) line of the check and an amount of money specified by the check;
    means for scanning the billing coupon to capture the billing account number assigned to the consumer by the biller;
    means for determining whether a size of the check is consistent with a size of a consumer check;
    means for determining whether a length of the MICR line of the check is consistent with a length of a MICR line of a check that is eligible to be converted into an Automated Clearing House (ACH) debit;
    means for extracting a routing/transfer (R/T) number from the MICR line of the check;
    means for storing a first table that associates R/T numbers with MICR line parsing formats;

means for using the first table to identify a MICR line parsing format associated with the R/T number extracted from the check;

means for identifying a check serial number of the check and an account number of the check by parsing the MICR line of the check using the identified MICR line parsing format;

means for storing a second table that contains a set of R/T numbers that are active;

means for using the second table to determine whether an R/T number of the check is active;

means for storing a third table that contains a set of R/T numbers associated with financial institutions that do not accept ACH transactions;

means for using the third table to determine whether the R/T number of the check is associated with a financial institution that does not accept ACH transactions;

means for storing a fourth table that lists billing account numbers assigned by the biller to consumers who have refused to allow the biller to convert checks into ACH debits;

means for using the fourth table to determine whether the consumer has refused to allow the biller to convert checks into ACH debits;

means for depositing the check at a financial institution when:
  1. a determination is made that the size of the check is not consistent with a size of a consumer check
  2. a determination is made that the length of the MICR line of the check is not consistent with a length of a MICR line of a check that is eligible to be converted into an ACH debit;
  3. a determination is made that the R/T number of the check is not active;
  4. a determination is made that the R/T number of the check is associated with a financial institution that does not accept ACH transactions; or
  5. a determination is made that the consumer has refused to allow the biller to convert checks into ACH debits;

means for creating an electronic file that contains the information needed to create an ACH debit at least when:
  1. a determination is made that the size of the check is consistent with a size of a consumer check;
  2. a determination is made that the length of the MICR line of the check is consistent with a length of a MICR line of a check that is eligible to be converted into an ACH debit;
  3. a determination is made that the R/T number of the check is active;
  4. a determination is made that the R/T number of the check is associated with a financial institution that does accept ACH transactions; and
  5. a determination is made that the consumer has not refused to allow the biller to convert checks into ACH debits;

means for sending the electronic file to an originating depository financial institution that originates an ACH debit based on the electronic file; and means for receiving upgrades to the first table, the second table, the third table, and the fourth table.

* * * * *